United States Patent
Lad et al.

(10) Patent No.: US 12,539,955 B1
(45) Date of Patent: Feb. 3, 2026

(54) THERMAL MANAGEMENT SYSTEMS AND METHODS THEREOF FOR MARINE VESSELS

(71) Applicant: Brunswick Corporation, Mettawa, IL (US)

(72) Inventors: Aniket Ajay Lad, Urbana, IL (US); Brennan J. Kelly, Urbana, IL (US)

(73) Assignee: Brunswick Corporation, Mettawa, IL (US)

( * ) Notice: Subject to any disclaimer, the term of this patent is extended or adjusted under 35 U.S.C. 154(b) by 123 days.

(21) Appl. No.: 18/529,112

(22) Filed: Dec. 5, 2023

(51) Int. Cl.
 *B63J 2/12* (2006.01)
 *B63B 25/12* (2006.01)
 *F24H 1/00* (2022.01)

(52) U.S. Cl.
 CPC ............... *B63J 2/12* (2013.01); *B63B 25/12* (2013.01); *F24H 1/009* (2013.01)

(58) Field of Classification Search
 CPC ........ B63J 2002/125; B63J 2/12; F24H 1/009
 See application file for complete search history.

(56) References Cited

U.S. PATENT DOCUMENTS

| | | |
|---|---|---|
| 3,721,104 A | 3/1973 | Adler |
| 4,226,606 A | 10/1980 | Yaeger |
| 4,617,472 A | 10/1986 | Slavik |
| 5,004,042 A | 4/1991 | McMorries, IV |
| 5,599,217 A | 2/1997 | Ferrante |
| 5,746,270 A | 5/1998 | Schroeder |
| 5,848,536 A | 12/1998 | Dodge |
| 6,273,771 B1 | 8/2001 | Buckley |
| 6,525,431 B1 | 2/2003 | Clucas |
| 6,612,504 B2 * | 9/2003 | Sendzik ............... B63J 2/14 165/41 |
| 7,066,777 B2 | 6/2006 | Maselter |
| 7,089,955 B1 | 8/2006 | Komro, Sr. |
| 7,094,118 B1 | 8/2006 | Phillips |

(Continued)

FOREIGN PATENT DOCUMENTS

| | | |
|---|---|---|
| CN | 102407931 A | 4/2012 |
| CN | 205930240 U | 2/2017 |

(Continued)

OTHER PUBLICATIONS

Search Report in corresponding Application No. GB2405641.8, dated Sep. 16, 2024, 5 pages.

(Continued)

*Primary Examiner* — Devon Lane
(74) *Attorney, Agent, or Firm* — Andrus Intellectual Property Law, LLP

(57) ABSTRACT

A thermal management system for a marine vessel includes a closed loop circuit in which heat transfer fluid circulates, a first refrigeration component cooled or heated by the heat transfer fluid and configured to cool or heat air within a compartment on the marine vessel, and an open loop circuit. A pump is configured to pump water from a body of water in which the marine vessel is operating, through the open loop circuit, and back to the body of water. A second refrigeration component is configured to exchange heat between the closed loop circuit and the open loop circuit, and a water heater is configured to receive heat from the closed loop circuit to thereby heat potable water in the water heater.

20 Claims, 10 Drawing Sheets

(56) References Cited

U.S. PATENT DOCUMENTS

| | | |
|---|---|---|
| 7,114,469 B1 | 10/2006 | Taylor |
| 7,150,664 B1 | 12/2006 | Uppgard |
| 7,156,709 B1 | 1/2007 | Staerzl |
| 7,172,831 B2 | 2/2007 | Jaura |
| 7,255,616 B1 | 8/2007 | Caldwell |
| 7,264,520 B1 | 9/2007 | Taylor |
| 7,284,710 B2 * | 10/2007 | Rixen ............... F24D 12/02 237/12.3 B |
| 7,416,456 B1 | 8/2008 | Gonring |
| 7,467,595 B1 | 12/2008 | Lanyi |
| 7,503,819 B1 | 3/2009 | Jaeger |
| 7,569,954 B2 | 8/2009 | Hans-Juergen |
| 7,789,176 B2 | 9/2010 | Zhou |
| 7,975,637 B1 | 7/2011 | Nida |
| 8,011,982 B1 | 9/2011 | Baier |
| 8,043,132 B1 | 10/2011 | Wyant |
| 8,137,146 B2 * | 3/2012 | Cohen ............... F01P 7/16 440/88 HE |
| 8,298,025 B2 | 10/2012 | Eichinger |
| 8,336,319 B2 | 12/2012 | Johnston |
| 8,403,234 B2 | 3/2013 | Wolter |
| 8,500,501 B1 | 8/2013 | Taylor |
| 8,535,104 B1 | 9/2013 | Nida |
| 8,763,566 B1 | 7/2014 | Taylor |
| 8,864,538 B1 * | 10/2014 | Arbuckle ............ B63H 21/383 440/88 P |
| 8,944,865 B1 | 2/2015 | Krabacher |
| 9,234,450 B2 | 1/2016 | England |
| 9,248,898 B1 | 2/2016 | Kirchhoff |
| 9,359,057 B1 | 6/2016 | Andrasko |
| 9,403,588 B1 | 8/2016 | George |
| 9,446,828 B1 | 9/2016 | Groeschel |
| 9,446,830 B2 | 9/2016 | Hartmeyer |
| 9,505,307 B2 | 11/2016 | Champagne |
| 9,680,190 B1 | 6/2017 | Xia |
| 9,758,010 B2 | 9/2017 | Johnston |
| 9,802,459 B2 | 10/2017 | Kamps |
| 9,802,687 B2 | 10/2017 | Davis |
| 9,815,539 B1 | 11/2017 | Provost |
| 9,975,619 B1 | 5/2018 | Gonring |
| 9,994,296 B1 | 6/2018 | Balogh |
| 10,047,661 B1 | 8/2018 | Torgerud |
| 10,151,539 B2 | 12/2018 | Kamps |
| 10,184,684 B2 | 1/2019 | Kurelowech |
| 10,336,429 B1 | 7/2019 | Amerling |
| 10,378,423 B1 | 8/2019 | Reichardt |
| 10,408,548 B2 | 9/2019 | Bell |
| 10,495,025 B2 | 12/2019 | Bell |
| 10,594,510 B1 | 3/2020 | Arbuckle |
| 10,889,205 B2 | 1/2021 | Hettrich |
| 10,890,098 B1 | 1/2021 | Anderson |
| 10,967,702 B2 | 4/2021 | Mancini |
| 11,072,408 B1 | 7/2021 | Kurzynski |
| 11,214,114 B2 | 1/2022 | Smith |
| 11,286,027 B1 | 3/2022 | Dharmadhikari |
| 11,293,335 B1 | 4/2022 | Radavich |
| 11,352,937 B1 | 6/2022 | Dreyer |
| 11,358,434 B2 | 6/2022 | Porras |
| 2002/0079376 A1 | 6/2002 | Harold |
| 2003/0226904 A1 | 12/2003 | Haklander |
| 2004/0142295 A1 * | 7/2004 | Holden ............... F02F 3/10 432/225 |
| 2006/0130888 A1 | 6/2006 | Yamaguchi |
| 2007/0147809 A1 | 6/2007 | Rixen |
| 2010/0279153 A1 | 11/2010 | Payne |
| 2012/0152186 A1 | 6/2012 | Sujan |
| 2012/0180997 A1 | 7/2012 | Johnston |
| 2016/0059949 A1 | 3/2016 | Rebele |
| 2016/0107505 A1 | 4/2016 | Johnston |
| 2018/0178615 A1 | 6/2018 | Xia |
| 2018/0354339 A1 | 12/2018 | Smith |
| 2018/0372334 A1 | 12/2018 | Walker |
| 2019/0176572 A1 | 6/2019 | Kim |
| 2019/0383563 A1 | 12/2019 | He |
| 2020/0255112 A1 | 8/2020 | Doremus |
| 2020/0370463 A1 * | 11/2020 | Saruwatari ............ F01P 3/202 |
| 2021/0197692 A1 | 7/2021 | Hettrich |
| 2022/0097484 A1 * | 3/2022 | Rixens ................ F24D 12/02 |
| 2022/0111700 A1 | 4/2022 | Henderson |
| 2022/0115719 A1 | 4/2022 | King |
| 2023/0242230 A1 * | 8/2023 | Nakagawa ............ B63H 21/38 440/88 C |
| 2024/0067049 A1 | 2/2024 | Kim |

FOREIGN PATENT DOCUMENTS

| | | | |
|---|---|---|---|
| CN | 108482064 A | 9/2018 | |
| CN | 209441180 U | 9/2019 | |
| CN | 110588277 A | 12/2019 | |
| CN | 112678139 A | 4/2021 | |
| CN | 112682157 A | 4/2021 | |
| CN | 213743657 U | 7/2021 | |
| CN | 114523816 B | 11/2022 | |
| DE | 102009056027 A1 | 4/2011 | |
| DE | 102021131215 A1 | 6/2022 | |
| EP | 2044370 A1 | 4/2009 | |
| EP | 2907739 A1 | 8/2015 | |
| EP | 3454401 A1 | 3/2019 | |
| GB | 2388184 A | 11/2003 | |
| JP | 2006103537 A | 4/2006 | |
| JP | 2014239607 A | 12/2014 | |
| KR | 20160124540 A * | 10/2016 | ............ B60H 1/025 |
| KR | 20170021142 A * | 2/2017 | ............... B63J 1/00 |
| KR | 20210015197 A | 2/2021 | |
| KR | 102542738 B1 | 6/2023 | |
| WO | 2010102606 A1 | 9/2010 | |
| WO | 2011005775 A1 | 1/2011 | |
| WO | 2013029808 A1 | 3/2013 | |
| WO | 2013124610 A2 | 8/2013 | |
| WO | 2021055758 A1 | 3/2021 | |

OTHER PUBLICATIONS

Search Report in corresponding Application No. EP24171732.1, dated Oct. 9, 2024, 8 pages.

Whale RV Catalog, pp. 8-9, https://www.delzer.com/navico/whale-rv-catalog/8/, accessed Apr. 11, 2023.

Dharmadhikari et al., "Marine Drives And Marine Vessels Having Cooling Systems", U.S. Appl. No. 17/978,758, filed Nov. 1, 2022 (drawings, specification, and claims only).

Dharmadhikari et al., "Thermal Management Systems and Methods for Thermally Managing Components for Marine Vessels", U.S. Appl. No. 17/900,470, filed Aug. 31, 2022 (drawings, specification, and claims only).

Dharmadhikari et al., "Thermal Management Systems For Marine Vessels", U.S. Appl. No. 17/988,104, filed Nov. 16, 2022 (drawings, specification, and claims only).

Kelly, "Thermal Management Systems For Marine Vessels", U.S. Appl. No. 17/977,570, filed Oct. 31, 2022 (drawings, specification, and claims only).

Denso, Heat Pump Air-Conditioning System, https://www.denso.com/global/en/business/products-and-services/mobility/pick-up/hpacs/, accessed Apr. 13, 2023.

Naik et al., "Marine Propulsion System and Method for Wake Control", U.S. Appl. No. 17/903,938, filed Sep. 6, 2022 (drawings, specification, and claims only).

Camco Marine, Kuuma 11 Gallon Marine Water Heater—120V Front Heat Exchanger Front/Back Mount, https://www.camcomarine.com/products/11-gal-water-heater-120v-front-heat-exch-fr-back-mount, accessed Nov. 10, 2023.

Witte, "Cooling System For A Marine Vessel", U.S. Appl. No. 18/053,513, filed Nov. 8, 2022 (drawings, specification, and claims only).

Eadie et al., "Thermal Management Systems And Methods For Recreational Vehicles", U.S. Appl. No. 18/310,250, filed May 1, 2023 (drawings, specification, and claims only).

* cited by examiner

THERMAL MANAGEMENT SYSTEMS AND METHODS THEREOF FOR MARINE VESSELS

FIELD

The present disclosure generally relates to thermal management systems and methods for marine vessels.

BACKGROUND

This Background is intended to introduce various aspects of the art, which may be associated with the present disclosure to thereby assist in providing a framework to facilitate a better understanding of particular aspects of the present disclosure. Accordingly, it should be understood that this Background should be read in this light, and not necessarily as admissions of prior art.

The following U.S. Patents are incorporated herein by reference in entirety.

U.S. Pat. No. 7,975,637 discloses methods and apparatuses for controlling the temperature of batteries in a hybrid marine vessel utilizing a compartment to store the batteries and various conduits to conduct air to and from that compartment. A heat exchanger can draw air from the compartment and cool the air for use in the cabin of the marine vessel. The air from the cabin can be directed into the compartment to provide a flow of air that carries heat away from the batteries in the compartment and toward the heat exchanger.

U.S. Pat. No. 8,864,538 discloses systems and methods for cooling a marine propulsion system on a marine vessel. A lift pump pumps raw cooling water from a body of water in which the marine vessel is situated. The lift pump pumps the raw cooling water through an open cooling circuit from an upstream inlet for receiving the raw cooling water to a downstream outlet for discharging the cooling water back to the body of water. A control circuit controls operation of the lift pump. At least one sensing device indicates whether the lift pump is connected to the body of water. The sensing device is in communication with the control circuit. The control circuit prevents operation of the lift pump when the sensing device indicates that the lift pump is not connected to the body of water.

U.S. Pat. No. 9,403,588 discloses systems for cooling a marine engine operated in a body of water. The systems can include an open loop cooling circuit for cooling the marine engine. The open loop cooling circuit is configured to convey cooling water from the body of water to the marine engine so that heat is exchanged between the cooling water and the marine engine. A pump is configured to pump the cooling water from upstream to downstream through the open loop cooling circuit. A heat exchanger is configured to cause an exchange of heat between the cooling water located upstream of the marine engine and the cooling water located downstream of the marine engine to thereby warm the cooling water located upstream of the marine engine, prior to cooling the marine engine.

SUMMARY

This Summary is provided to introduce a selection of concepts that are further described below in the Detailed Description. This Summary is not intended to identify key or essential features of the claimed subject matter, nor is it intended to be used as an aid in limiting the scope of the claimed subject matter.

In certain independent examples, a thermal management system for a marine vessel includes a closed loop circuit in which heat transfer fluid circulates, a first refrigeration component cooled or heated by the heat transfer fluid and configured to cool or heat air within a compartment on the marine vessel, and an open loop circuit. A pump is configured to pump water from a body of water in which the marine vessel is operating, through the open loop circuit, and back to the body of water. A second refrigeration component is configured to exchange heat between the closed loop circuit and the open loop circuit, and a water heater is configured to receive heat from the closed loop circuit to thereby heat potable water in the water heater.

Optionally, a first valve is for selecting whether heat is exchanged between the heat transfer fluid and the potable water in the water heater or the heat transfer fluid bypasses the water heater. Optionally, a heat exchanger is configured to exchange heat between the heat transfer fluid and the potable water. Optionally, a second valve is for selecting whether the potable water flows via a first water path to the heat exchanger or a second water path such that the potable water flows directly from a storage tank to a reservoir of the water heater. Optionally, a water pump conveys the potable water from the potable water storage tank to the water heater. Optionally, the closed loop circuit is a first closed loop circuit, the pump is a first pump, the heat transfer fluid is a first heat transfer fluid, and the open loop circuit is a first open loop circuit. The system also includes a second closed loop circuit, a second pump that pumps a second heat transfer fluid through the second closed loop circuit; an electric motor system cooled or heated by the second heat transfer fluid, a second open loop circuit, a third pump configured to pump water from the body of water, through the second open loop circuit, and back to the body of water, and a third refrigeration component configured to exchange heat between the second closed loop circuit and the second open loop circuit. The second closed loop circuit heats the potable water in the water heater, and the water heater is configured to receive heat from the second closed loop circuit to thereby heat the potable water. Optionally, a third valve is for selecting whether heat is exchanged between the second heat transfer fluid and the potable water in the water heater or the second heat transfer fluid bypasses the water heater. Optionally, the system includes a third open loop circuit, a fourth pump configured to pump water from the body of water, through the third open loop circuit, and back to the body of water, and a drive system configured to exchange heat with the water passing through the third open loop circuit. The water heater is configured to receive heat from the third open loop circuit to thereby heat the potable water. Optionally, the closed loop circuit is a first closed loop circuit, the pump is a first pump, the heat transfer fluid is a first heat transfer fluid, and the open loop circuit is a first open loop circuit, and the system also includes a third open loop circuit, a fourth pump configured to pump water from the body of water, through the third open loop circuit, and back to the body of water, and a drive system configured to exchange heat with the water passing through the third open loop circuit. The water heater is configured to receive heat from the third open loop circuit to thereby heat the potable water. Optionally, a fourth valve for selecting whether heat is exchanged between the water in the third open loop circuit and the potable water in the water heater or the water in the third open loop circuit bypasses the water heater.

In certain independent examples, a method of heating potable water in a water heater on a marine vessel includes circulating a heat transfer fluid through a closed loop circuit, cooling or heating a refrigeration component with the heat transfer fluid such that the refrigeration component cools or heats air in a compartment of the marine vessel, pumping water from a body of water in which the marine vessel is operating through an open loop circuit and back to the body of water, exchanging heat between the closed loop circuit and the open loop circuit, and receiving heat into the water heater from the closed loop circuit to heat the potable water in the water heater.

Optionally, the method includes operating a first valve to selectively exchange heat between the heat transfer fluid and the potable water in the water heater or route the heat transfer fluid to bypass the water heater. Optionally, the method includes exchanging heat, with a heat exchanger, between the heat transfer fluid and the potable water. Optionally, the method includes operating a second valve to selectively route the potable water along a first water path to the heat exchanger or a second water path such the potable water flows directly from a potable water storage tank to a reservoir of the water heater. Optionally, the method includes pumping the potable water from the potable water storage tank to the water heater. Optionally, the closed loop circuit is a first closed loop circuit, the heat transfer fluid is a first heat transfer fluid, the open loop circuit is a first open loop circuit, and the method also includes pumping a second heat transfer fluid through a second closed loop circuit, cooling or heating an electric motor system with the second heat transfer fluid, pumping water from the body of water through a second open loop circuit and back to the body of water, exchanging heat between the second closed loop circuit and the second open loop circuit, and receiving heat into the water heater from the second closed loop circuit to heat the potable water in the water heater. Optionally, the method includes operating a third valve to selectively exchange heat between the second heat transfer fluid and the potable water in the water heater or route the second heat transfer fluid to bypass the water heater. Optionally, the method includes pumping water from the body of water through a third open loop circuit and back to the body of water, cooling or heating a drive system with the water in the third open loop circuit, and receiving heat into the water heater from the third open loop circuit to heat the potable water in the water heater. Optionally, the method includes operating a fourth valve to selectively exchange heat between the water in the third open loop circuit and the potable water in the water heater or route the water in the third open loop circuit to bypass the water heater.

Various other features, objects, and advantages will be made apparent from the following description taken together with the drawings.

BRIEF DESCRIPTION OF THE DRAWINGS

The present disclosure is described with reference to the following Figures. The same numbers are used throughout the Figures to reference like features and like components.

DETAILED DESCRIPTION

The present disclosure generally relates to thermal management systems for marine vessels. As discussed further below, these thermal management systems are operable to transfer thermal energy between components on the marine vessel by utilizing one or more fluids. For example, one or more refrigeration components, such as an evaporator, a condenser, and/or a heat exchanger, facilitate the absorption of heat into a heat transfer fluid and the heat transfer fluid is configured to heat potable water in a water heater. It should be recognized that the fluids disclosed herein may be liquids, gases, or a combination of both.

Figure 1:
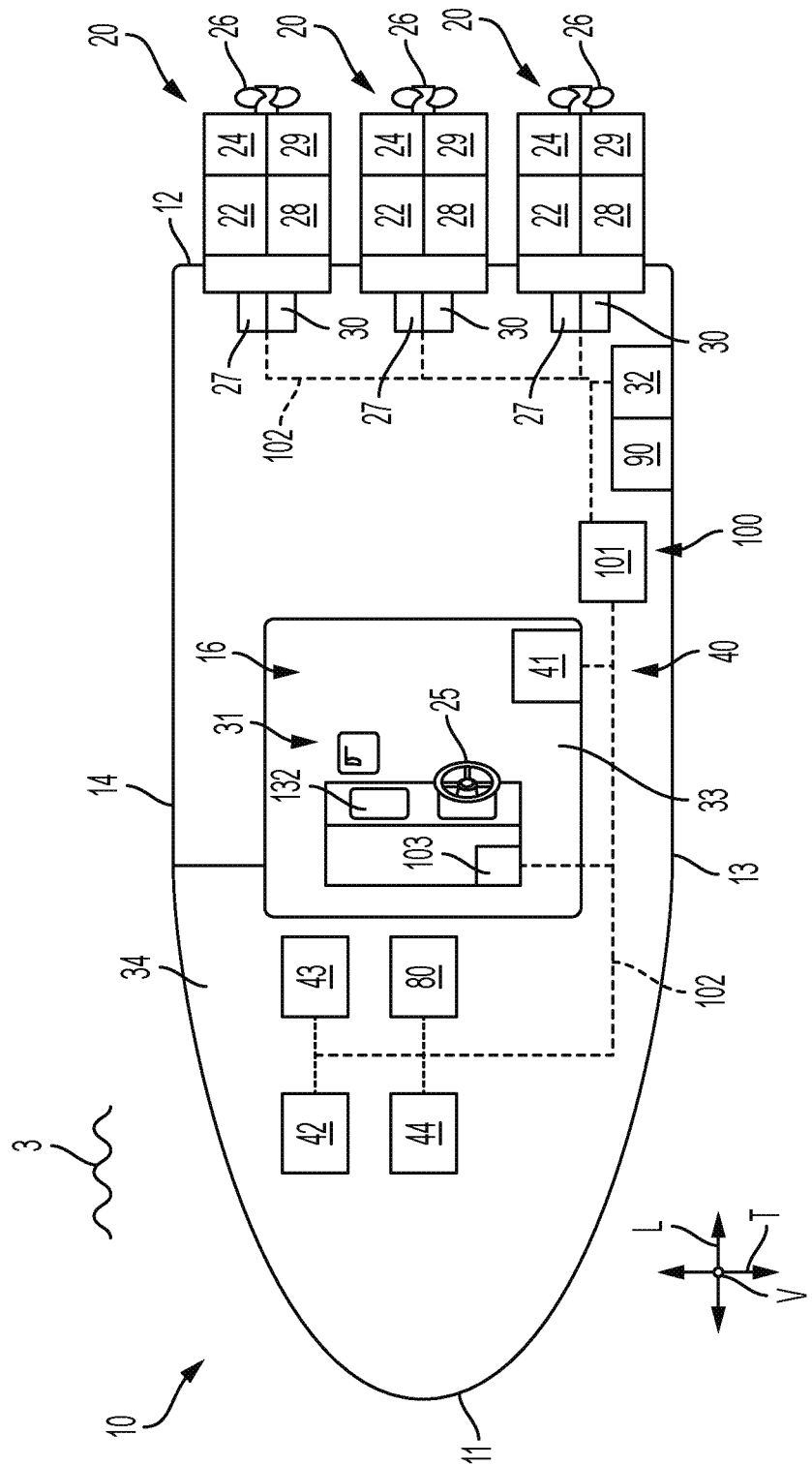
FIG. 1 is a top view of a marine vessel incorporating a thermal management system according to the present disclosure.

FIG. 1 shows a thermal management system 40 for a marine vessel 10 according to the present disclosure. The marine vessel 10 longitudinally extends between a bow 11 and a stern 12 (see example longitudinal axis L) and transversely extends between a port side 13 and starboard side 14 (see example transverse axis T which is perpendicular to the longitudinal axis L). Note that the transverse axis T and the longitudinal axis L are each also perpendicular to an example vertical axis V. The marine vessel 10 is propelled through a body of water 3 by marine propulsion devices 20, which while shown as outboard motors could also be inboard motors, stern drives, pod drives, and/or jet drives. Each marine propulsion device 20 includes a powerhead 22. The powerheads 22 can include internal combustion engines (e.g., gasoline or diesel engines), electric motors, and/or hybrids thereof. The powerhead 22 can include electrical power systems 32 in the case of electric or hybrid powerheads. The power system 32 may include batteries and/or other power storage devices, chargers, inverters (e.g., DC-AC inverters, AC-DC inverters), converters (e.g., DC-DC converters), and power distribution systems.

A propeller 26 is coupled in a torque-transmitting relationship with each powerhead 22 to generate propulsion in the water. The rotational engagement between the powerhead 22 and the propeller 26 is provided through a multi-speed transmission 28 and gearset 29. The marine propulsion devices 20 further include one or more sensors 24 for sensing various characteristics of the marine propulsion devices 20 and/or the marine vessel 10 such as marine vessel speed and/or speed of the respective powerheads 22.

Steering actuators 27 are operable to steer the marine propulsion devices 20 in accordance with commands from a steering input device such as a steering wheel 25. The steering actuators 27 may be hydraulically, pneumatically, and/or electromechanically operated such as those discussed in U.S. Pat. Nos. 7,150,664; 7,255,616; and 7,467,595, which are hereby incorporated by reference in their entireties. Similarly, trim actuators 30 are operable to adjust a trim angle for each of the marine propulsion devices 20 in a manner known in the art. The trim actuators 30 may be hydraulically, pneumatically, and/or electromechanically operated such as those discussed in U.S. Pat. Nos. 7,156,709; 7,416,456; and 9,359,057, which are incorporated by reference herein.

With continued reference to FIG. 1, a central control module 101 (or CCM) is provided in signal communication with propulsion control modules 21 of the marine propulsion devices 20, as well as with other devices discussed herein. Although FIG. 1 shows one central control module 101, the present disclosure contemplates configurations in which multiple central control modules work together, serially and/or in parallel (e.g., providing a central control module for each marine propulsion devices 20). Likewise, it should be recognized that the communication links 102 shown to represent both communication and power connections are merely examples.

With continued reference to FIG. 1, the marine vessel 10 includes a helm 16 having a number of operator input devices for controlling various functions of the thermal management system 40 and the marine vessel 10 more generally. The operator input devices at the helm 16 include a multi-functional display device 132 including a user interface, such as an interactive, touch-capable display screen, a keypad, a display screen and keypad combination, and/or any other interfaces known in the art. By way of example, the display device 132 may be part of a VesselView® onboard management system by Mercury Marine Corporation of Fond du Lac, Wisconsin. The operator input devices further include one or more steering devices, such as the steering wheel and/or a joystick, configured to facilitate user input for steering the marine vessel 10 (e.g., via the central control module 101, the propulsion control modules 21, and/or a helm controller 103 in a manner known in the art). In certain examples, a throttle lever 31 is also provided as an operator input device for providing thrust commands to the central control module 101. Additional information relating to input devices and related control is provided in U.S. Pat. Nos. 9,248,898; 9,975,619; 9,994,296; and 10,594,510; which are incorporated by reference herein.

The helm 16 of the marine vessel 10 is positioned in a cockpit 33. In certain examples, the cockpit 33 is positioned adjacent or above a cabin 34. Various devices or systems 41-44, 80 are positioned within the cockpit 33 and/or within the cabin 34 that require heating and/or cooling depending on usage. Non-limiting examples of these devices or systems 41-44, 80 are identified herein below. For example, the marine vessel 10 has a HVAC system 41 for the cockpit 33, which requires heating when controlled to heat the air in the cockpit 33 and cooling when controlled to cool the air in the cockpit 33. The marine vessel 10 includes a second HVAC system 42 for the cabin 34, which like the HVAC system for the cockpit 33, requires heating when controlled to heat air in the cabin 34 and cooling when controlled to cool air in the cabin 34, a refrigerator 43 which only requires cooling (note that the refrigerator can also be referred to as being a heat "source"), a freezer 44 requiring only cooling, and/or a water heater 80 configured to require only heating (note that the water heater can also be referred to a heat "sink") to heat potable water therein. The devices or systems 41-44, 80 are selectively heated or cooled by the thermal management system 40 and may include other heat sources, heat sinks, or combinations thereof associated with the marine propulsion devices 20 or marine vessel 10. By way of example, these other components may include powerheads 22, multi-speed transmissions (not depicted), or portions of the power system 32.

Figure 2:
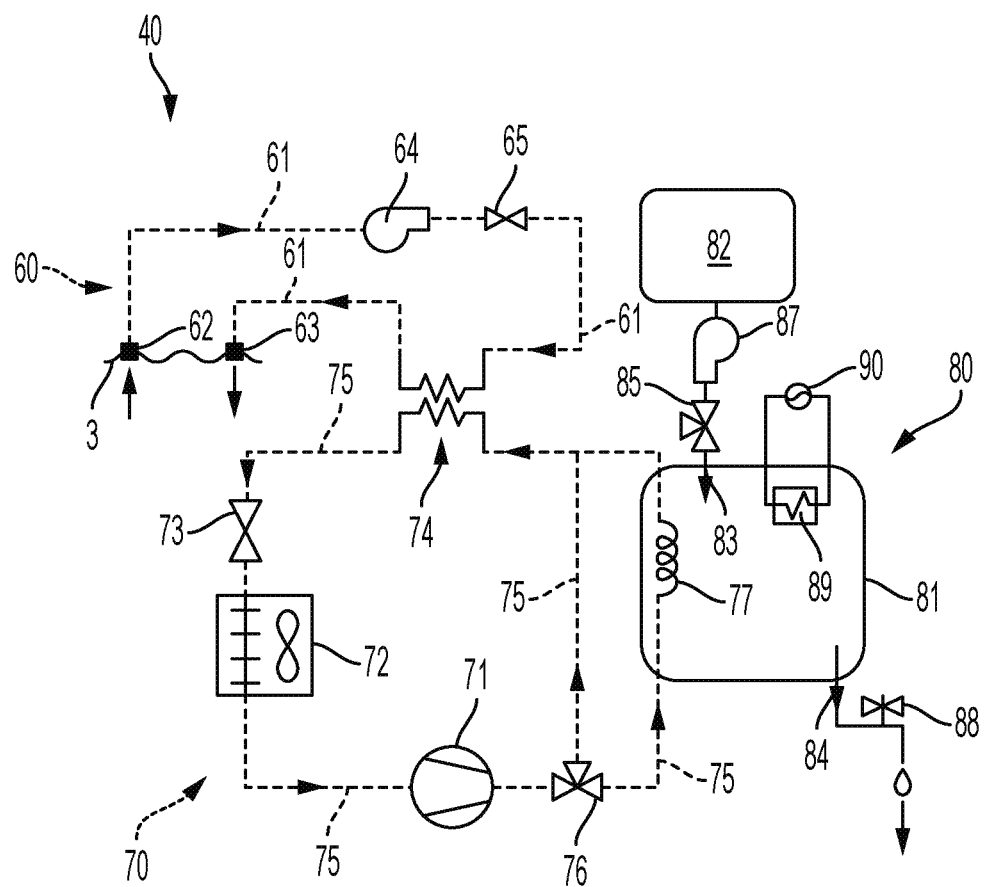
FIG. 2 is a schematic view of an example thermal management system according to the present disclosure.

FIG. 2 depicts an example thermal management system 40 for sharing heating and cooling across one or more of the devices or systems 41-44, 80 of the marine vessel 10 according to the present disclosure.

The system 40 includes a first open loop circuit 60 that extends via conduits 61 (depicted partially in dashed lines) between a water inlet 62 and a water outlet 63. The water inlet 62 is positioned to draw water from the body of water 3 in which the marine vessel 10 is operated into the first open loop circuit 60. The water outlet 63 is positioned to return the water from the first open loop circuit 60 back to the body of water 3. The conduits 61 may be combinations of hoses, pipes, through-holes, and/or passages through certain components (such as heat exchangers as discussed below). In certain examples, the water inlet 62 and/or the water outlet 63 are formed in a gearcase of a marine propulsion device 20 or provided as a through-hole in the hull of the marine vessel 10 in a conventional manner.

A pump 64 is fluidly coupled to the first open loop circuit 60 and pumps the water from the body of water 3 into the water inlet 62, through the first open loop circuit 60, and back to the body of water 3 via the water outlet 63. Optionally, a valve 65 is coupled to the first open loop circuit 60 and is selectively opened to permit the water to be pumped through the first open loop circuit 60. As will be described in greater detail herein below, a first refrigeration component is also fluidly coupled to the first open loop circuit 60.

The thermal management system 40 further includes a first closed loop circuit 70 formed by conduits 75 (depicted partially as dashed lines) through which a first heat transfer fluid is circulated. The first heat transfer fluid can be any suitable fluid such as water, a refrigerant used in air conditioning systems, a water-ethylene-glycol (WEG) mixture, or oil. The conduits 75 may be similar to the conduits 61 of the first open loop circuit 60.

The first closed loop circuit 70 is at least partially associated with one or more of the HVAC systems 41, 42 of the marine vessel 10, and therefore, the first closed loop circuit 70 is configured to facilitate cooling or heating of the air within a compartment (e.g., the cockpit 33, the cabin 34) of the marine vessel 10.

Figure 3:
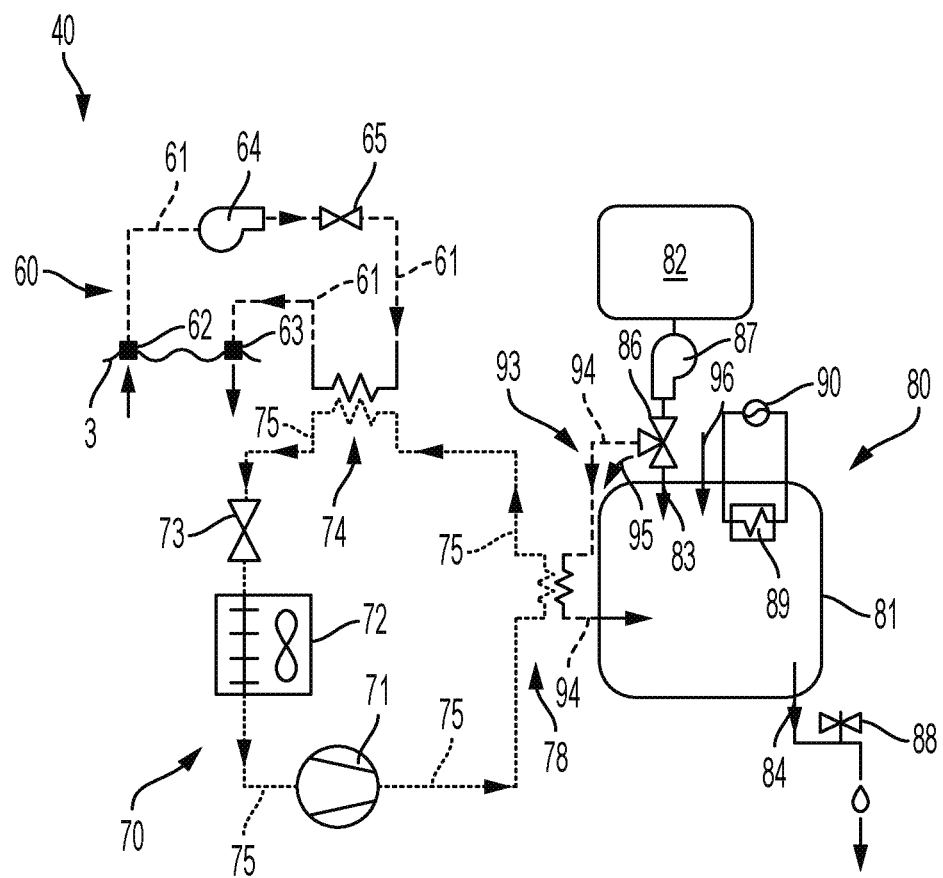
FIG. 3 is a schematic view of another example thermal management system according to the present disclosure.

One or more refrigeration components are coupled to the first closed loop circuit 70, and the refrigeration components may be any known refrigeration component such as a compressor 71, an evaporator 72, an expansion valve 73, a condenser 74, and/or heat exchanger 78 (FIG. 3). In certain examples, the compressor 71 circulates the first heat transfer fluid through the first closed loop circuit 70. Optionally, a pump (not depicted) is fluidly coupled to the first closed loop circuit 70 and is configured to pump the first heat transfer fluid through the first closed loop circuit 70.

A refrigeration component, such as the condenser 74, is configured to exchange heat between the first heat transfer fluid in the first closed loop circuit 70 and the water in the first open loop circuit 60. As such, the first heat transfer fluid in the first closed loop circuit 70 is cooled or heated and another refrigeration component, such as an evaporator 72, is cooled or heated by the first heat transfer fluid and configured to cool or heat air within a compartment, such as the cockpit 33, of the marine vessel 10.

The first closed loop circuit 70 is also configured to exchange heat between the first heat transfer fluid in the first closed loop circuit 70 and potable water in the water heater 80. In one example, the first closed loop circuit 70 extends through a coil 77 positioned in the water heater 80 (described in more detail herein). In this example, the first heat transfer fluid passes through the coil 77 such that heat transfers from the first heat transfer fluid to the potable water in the water heater 80. A valve 76 is coupled to the first closed loop circuit 70 that operates to selectively allow the first heat transfer fluid to flow through the coil 77 or bypass the coil 77. As such, the valve 76 is for selecting whether heat is exchanged between the first heat transfer fluid and the potable water in the water heater 80 or the first heat transfer fluid bypasses the water heater 80. In one non-limiting example, the valve 76 is operated into a first position such that the first heat transfer fluid does not flow through the coil 77 or a second position such that the first heat transfer fluid flows through the coil 77.

The water heater 80 is configured to receive heat from the first closed loop circuit 70 to thereby heat potable water in the water heater 80. The water heater 80 has a reservoir 81 which receives potable water from a potable water source, such as a storage tank 82, via an inlet 83. The potable water dispenses from the reservoir 81 via an outlet 84 to a use valve 88, such as a faucet. Optionally, a shutoff valve 85 is positioned between the storage tank 82 and the inlet 83. In certain examples, a pump 87 pumps the potable water from the storage tank 82 to the reservoir 81. In certain examples, the water heater 80 includes a positive temperature coefficient (PTC) heater 89 that receives power from a power source (e.g., power source 90 of the marine vessel 10) and is configured to optionally heat the potable water in the reservoir 81.

FIG. 3 depicts another example thermal management system 40 for sharing heating and cooling across one or more of the devices or systems of the marine vessel 10. The system 40 depicted in FIG. 3 can include one or more features and/or components described with reference to the system 40 depicted in FIG. 2. Similarly, the system 40 described with reference to FIG. 2 can include any features and/or components described with reference to the system 40 described below. Note that components indicated in FIG. 3 that are similar to the components indicated in FIG. 2 are denoted with the same part numbers, however, it should be understood that the use of the same part numbers for systems and/or components of the present disclosure should not be construed to indicate that the similarly marked systems and/or components are necessarily identical. The similarly marked systems and/or components may have varying features or characteristics. For instance, the storage tank 82 of FIG. 3 may be configured to have a different capacity and/or the like relative to the storage tank 82 of FIG. 2.

The system 40 depicted in FIG. 3 includes several features and components that are described above with respect to FIG. 2 and includes a first heat exchanger 78 configured to exchange heat between the first heat transfer fluid in the first closed loop circuit 70 and the potable water. Specifically, the first closed loop circuit 70 and a potable water circuit 93 (described herein) extend through the first heat exchanger 78 and accordingly, the first heat exchanger 78 is configured such that the first heat transfer fluid in the first closed loop circuit 70 heats the potable water in the potable water circuit 93 (described further herein). Note that additional information regarding conventional heat exchangers and conventional cooling circuits is provided in U.S. Pat. Nos. 5,004,042; 5,746,270; and 7,094,118, which are hereby incorporated by reference in their entireties.

In the example depicted in FIG. 3, a coil 77 (see for example FIG. 2) is not placed within the reservoir 81. Thus, the first heat transfer fluid in the first closed loop circuit 70 does not enter the water heater 80. This configuration advantageously reduces the risk of the first heat transfer fluid inadvertently contaminating the potable water in the water heater 80, which may occur due to the deterioration or a leak in the conduits 75 and/or the coil 77 (see FIG. 2). The configuration also advantageously utilizes the waste heat from the first closed loop circuit 70 in the case when the condensation temperature is higher than the incoming potable water temperature to the heat exchanger 78, but lower than the hot water temperature in the hot water reservoir 81.

The potable water circuit 93 has one or more conduits 94 that extend from a valve 86 which is positioned between the pump 87 and the inlet 83. The conduits 94 further extend through the first heat exchanger 78 and to the reservoir 81. The valve 86 is configured to selectively allow potable water to flow to the first heat exchanger 78 such that the potable water is heated by the first heat transfer fluid in the first closed loop circuit 70. In one non-limiting example, the valve 86 is operated into a first closed position in which the potable water flows from the pump 87 along a first water path 95 through the conduits 94 to the first heat exchanger 78. As such, the relatively cooler potable water from the storage tank 82 is pumped by the pump 87 to the first heat exchanger 78 where the first heat transfer fluid in the first closed loop circuit 70 heats the potable water. The heated potable water flows into the reservoir 81. Note that in certain examples, the first heat exchanger 78 is utilized with the certain example systems 40 when the heat needed to heat the potable water is greater than the temperature of the first heat transfer fluid in the first closed loop circuit 70 so that the potable water in the water heater 80 does not heat the first heat transfer fluid.

The valve 86 is operated to a second closed position in which the potable water flows from the pump 87 along a second water path 96 through the inlet 83 and into the reservoir 81. As such, relatively cooler potable water from the storage tank 82 is not heated in the first heat exchanger 78 and is instead pumped into the reservoir 81.

The valve 86 can also be operated to a third closed position in which the potable water circulates along a third water path which comprises portions of the first and second water paths 95, 96 such that potable water in the reservoir 81 circulates through the first heat exchanger 78 by way of convection. As such, no new, relatively cooler potable water enters the reservoir 81. The water in the reservoir 81 is maintained at a threshold temperature. The valve 76 can be further operated to a fourth position in which the potable water remains in the reservoir 81 (e.g., the potable water does not circulate through the first heat exchanger 78 and the potable water from the storage tank 82 does not enter the reservoir 81).

Figure 4:
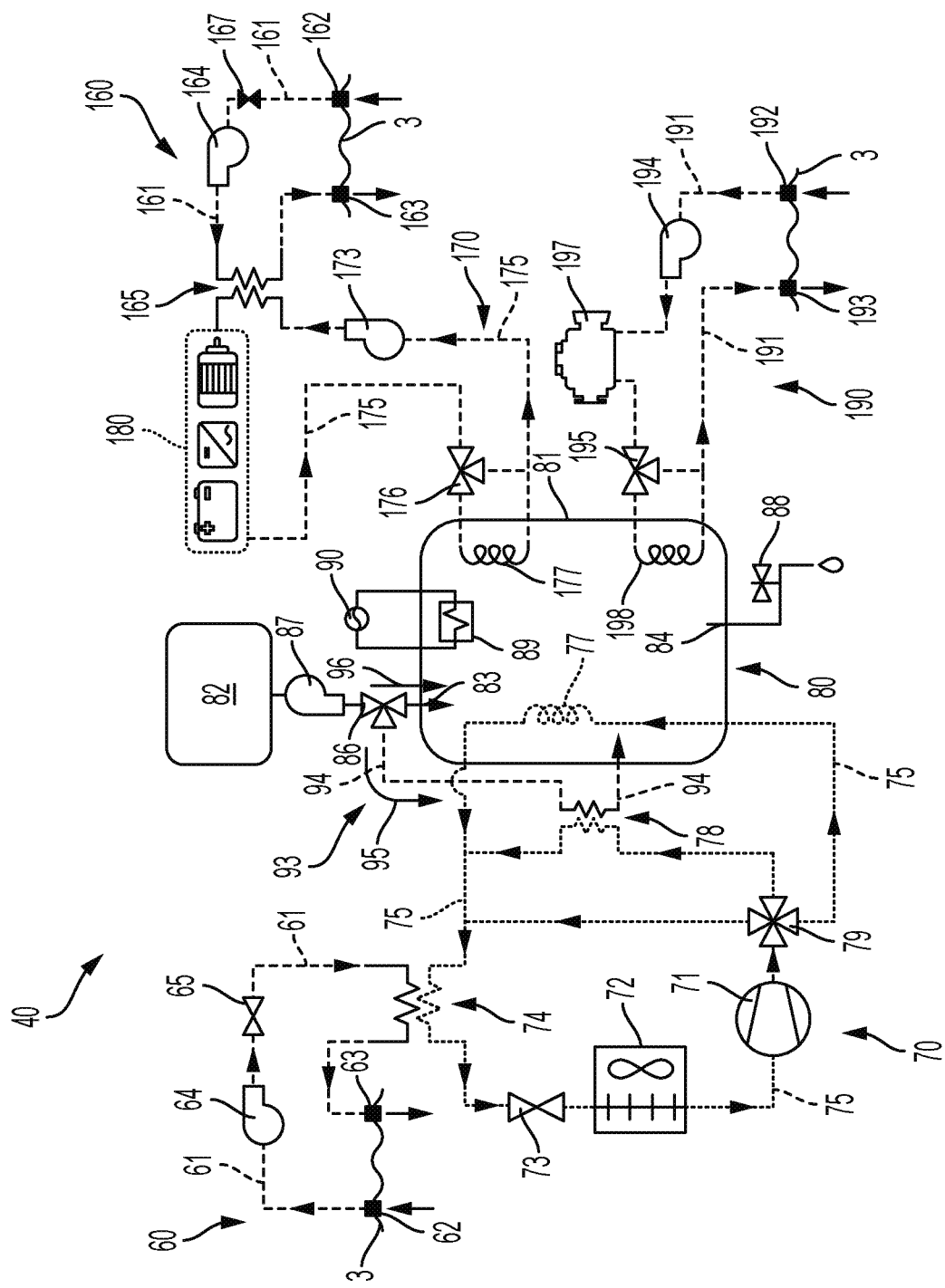
FIG. 4 is a schematic view of another example thermal management system according to the present disclosure.

FIG. 4 depicts another example thermal management system 40 for sharing heating and cooling across one or more of the devices or systems of the marine vessel 10. The system 40 depicted in FIG. 4 can include one or more features and/or components described with reference to the system 40 depicted in FIGS. 2-3. Similarly, the system 40 described with reference to FIGS. 2-3 can include any features and/or components described with reference to the system 40 described below. Note that components indicated on FIG. 4 that are similar to the components indicated in FIG. 2 or 3 are denoted with the same part numbers, however, it should be understood that the use of the same part numbers for systems and/or components of the present disclosure should not be construed to indicate that the similarly marked systems and/or components are necessarily identical. The similarly marked systems and/or components may have varying features or characteristics. For instance, the storage tank 82 of FIG. 4 may be configured to have a different capacity and/or the like relative to the storage tank 82 of FIG. 3.

The system 40 depicted in FIG. 4 includes several features and components that are described above with respect to FIG. 2 and/or FIG. 3. Like the example system 40 depicted in FIGS. 2-3, the first closed loop circuit 70 is configured to exchange heat between the first heat transfer fluid in the first closed loop circuit 70 and potable water in the water heater 80. The system 40 depicted in FIG. 4 includes the first heat exchanger 78 and the coil 77. As such, the system 40 is configured to heat the potable water by utilizing the first heat exchanger 78 and/or the coil 77 separately or together to exchange heat between the first heat transfer fluid and the potable water.

A valve 79 is similar to the valve 76 noted above with respect to FIG. 2 is configured to operate to selectively allow the first heat transfer fluid to flow through the coil 77 or the first heat exchanger 78 separately, flow through both the coil 77 and the first heat exchanger 78 together, and/or bypass one or both of the coil 77 and the first heat exchanger 78. As such, the valve 76 is for selecting whether heat is exchanged between the first heat transfer fluid and the potable water via the coil 77 and/or the first heat exchanger 78.

For example, the valve 79 is operated into several different positions to thereby change the flow of the first heat transfer fluid through the first closed loop circuit. 70 The valve 79 is operable to a first position such that the first heat transfer fluid flows through the first heat exchanger 78 but not the coil 77. The valve 79 is operable to a second position such that the first heat transfer fluid flows through the coil 77 but not the first heat exchanger 78. The valve 79 is operable to a third position such that the first heat transfer fluid flows through both the coil 77 and the first heat exchanger 78. The valve 79 is operable to a fourth position such that the first heat transfer fluid does not flow through either of the coil 77 and the first heat exchanger 78.

The system 40 depicted in FIG. 4 also includes one or more additional open loop circuits and/or closed loop circuits for exchanging heat with the potable water in the water heater 80 and/or one or more systems or components of the marine vessel 10.

In one example, the system 40 includes a second open loop circuit 160 that extends via conduits 161 (depicted as dashed lines) between a water inlet 162 and a water outlet 163. The water inlet 162 is positioned to draw water from the body of water 3 in which the marine vessel 10 is operated into the second open loop circuit 160. The water outlet 163 is positioned to return the water from the second open loop circuit 160 back to the body of water 3. The conduits 161 may be combinations of hoses, pipes, through-holes, and/or passages through certain components (such as a second heat exchanger 165 as described below). In certain examples, the water inlet 162 and/or the water outlet 163 are formed in a gearcase of a marine propulsion device 20 or provided as a through-hole in a hull of the marine vessel 10 in a conventional manner.

A pump 164 is fluidly coupled to the second open loop circuit 160 and pumps the water from the body of water 3 into the water inlet 162, through the second open loop circuit 160, and back to the body of water 3 via the water outlet 163. Optionally, a valve 167 is coupled to the second open loop circuit 160 and is selectively opened to permit the water to be pumped through the second open loop circuit 160. As will be described in greater detail herein below, a second heat exchanger 165 is also fluidly coupled to the second open loop circuit 160.

The thermal management system 40 further includes a second closed loop circuit 170 formed by conduits 175 (depicted as dashed lines) through which a second heat transfer fluid is circulated. The second heat transfer fluid can be any suitable fluid such as water, a refrigerant used in air conditioning systems, a water-ethylene-glycol (WEG) mixture, or oil. The conduits 175 may be similar to the conduits 75 of the first closed loop circuit 70.

A pump 173 is fluidly coupled to the second closed loop circuit 170 and is configured to pump the second heat transfer fluid through the second closed loop circuit 170.

The second closed loop circuit 170 is at least partially associated with an electric drive or motor system 180 of the marine vessel 10 and therefore the second closed loop circuit 170 is configured to facilitate cooling or heating of the electric motor system 180. Note that in certain examples the electric motor system 180 is part of and/or coupled to the power system 32 (FIG. 1) and/or the propulsion devices 20 of the marine vessel 10. The electric motor system 180 comprises one or more components such as an electric motor, a battery, a battery charger, a DC-DC converter, and/or the like. The components of the electric motor system 180 may define one or more passageways through which the second heat transfer fluid in the second closed loop circuit 170 flows.

The second closed loop circuit 170 extends through the second heat exchanger 165, and as discussed above, the second open loop circuit 160 also extends through the second heat exchanger 165. The second heat exchanger 165 is configured such that heat is exchanged between the second heat transfer fluid in the second closed loop circuit 170 and the water in the second open loop circuit 160. The second heat transfer fluid in the second closed loop circuit 170 is circulated to heat or cool one or more components of the electric motor system 180, as needed.

The second closed loop circuit 170 is also configured to exchange heat between the second heat transfer fluid in the second closed loop circuit 170 and potable water in the water heater 80. In one example, the second closed loop circuit 170 extends through a coil 177 positioned in the water heater 80. As such, the second heat transfer fluid passes through the coil 177 and heat transfers from the second heat transfer fluid to the potable water in the water heater 80. A valve 176 is coupled to the second closed loop circuit 170 that operates to selectively allow the second heat transfer fluid to flow through the coil 177 or bypass the coil 177. Accordingly, the valve 176 is for selecting whether heat is exchanged between the second heat transfer fluid and the potable water in the water heater 80 or the second heat transfer fluid bypasses the water heater 80. In one non-limiting example, the valve 176 is operated into a first position such that the second heat transfer fluid does not flow through the coil 177 or a second position such that the second heat transfer fluid flows through the coil 177.

In certain examples, the second closed loop circuit 170 may be particularly advantageous for warming a component of the electric motor system 180, such as a battery, early in operation or for operation in cold temperatures. For instance, the second closed loop circuit 170 may transfer heat from the potable water in the water heater 80 to the electric motor system 180. It should also be recognized that if the thermal management system 40 determines that the component (e.g., battery) of the electric motor system 180 no longer needs to be heated, the valve 176 may be closed to prevent further heating via the second heat transfer fluid in the second closed loop circuit 170 and/or turning off the pump 173. In certain examples, a PTC heater (not depicted) is configured to heat the second heat transfer fluid in the second closed loop circuit 170 for warming a component of the electric motor system 180. In certain examples, the second open loop circuit 160 and/or the second closed loop circuit are operated in a heat pump mode such that heat is transferred into the second heat transfer fluid in the second closed loop circuit 170 to warm a component of the electric motor system 180.

In one example, the system 40 includes a third open loop circuit 190 that extends via conduits 191 (depicted as dashed lines) between a water inlet 192 and a water outlet 193. The water inlet 192 is positioned to draw water from the body of water 3 in which the marine vessel 10 is operated into the third open loop circuit 190. The water outlet 193 is positioned to return the water from the third open loop circuit 190 back to the body of water 3. The conduits 191 may be combinations of hoses, pipes, through-holes, and/or passages through certain. In certain examples, the water inlet 192 and/or the water outlet 193 are formed in a gearcase of a marine propulsion device 20 or provided as a through-hole in a hull of the marine vessel 10 in a conventional manner.

A pump 194 is fluidly coupled to the third open loop circuit 190 and pumps the water from the body of water 3 into the water inlet 192, through the third open loop circuit 190, and back to the body of water 3 via the water outlet 193.

The third open loop circuit 190 is at least partially coupled to a drive system 197 (e.g., an internal combustion engine drive system, an electric drive or motor system, a hybrid drive system comprising an internal combustion engine and an electric drive or motor) and therefore the third open loop circuit 190 is configured to facilitate cooling or heating of the drive system 197. Note that in certain examples the drive system 197 is part of and/or coupled to the powerhead 22 (FIG. 1) of the marine vessel 10. In certain examples, the drive system 197 is coupled to the power system 32 and/or the propulsion devices 20 of the marine vessel 10. The drive system 197 comprises one or more components such as an inverter, motor, battery, a converter (e.g., AC-DC or DC-AC), a power distribution unit, and/or the like. The components may define one or more passageway through which the water in the third open loop circuit 190 flows.

The third open loop circuit 190 is configured to exchange heat between the water in the third open loop circuit 190 and the potable water in the water heater 80. In one example, the third open loop circuit 190 extends through a coil 198 positioned in the water heater 80. As such, the water passes through the coil 198 such that heat transfers from the water to the potable water in the water heater 80. A valve 195 is coupled to the third open loop circuit 190 that operates to selectively allow the water to flow through the coil 198 or bypass the coil 198. Accordingly, the valve 195 is for selecting whether heat is exchanged between the water and the potable water in the water heater 80 or the second heat transfer fluid bypasses the water heater 80. In one non-limiting example, the valve 195 is operated into a first position such that the water does not flow through the coil 198 or a second position such that the water flows through the coil 177.

In certain example, the drive system 197 includes components that are only heat sources, such as powerheads and transmissions, of the drive system 197. In this case, the valve 195 may be positioned such that the water flows through the coil 177 only when the temperature of the potable water in the water heater drops below a threshold temperature.

In certain examples, the second open loop circuit 160 is configured to convey the water from the body of water 3 in a similar manner to the first open loop circuit 60 discussed above. In certain examples, rather than having a distinct inlet, outlet, and pump, the second open loop circuit 160 and/or the third open loop circuit 190 is fluidly connected to the first open loop circuit 60 to receive the water from the same water inlet 62 and to return the water to the body of water via the same water outlet 63 discussed above. The same pump 64 discussed above is also used to pump the water throughout the second open loop circuit 160 and/or the third open loop circuit 190

Additional details and features of the example thermal management systems 40 of the present disclosure, including example control and operational features of components thereof, are described herein below. The details and features described below may be incorporated into any example thermal management systems 40 of the present disclosure. For example, while certain details and features described herein below are described with reference to one of the example systems 40 of the present disclosure, these details and features may be similarly incorporated into any other systems 40 of the present disclosure.

It should also be recognized that the thermal management systems 40 of the present disclosure advantageously provide for customization and scalability for heating and cooling other components of the marine vessel 10. For example, the components (e.g., water heater) or the systems (e.g., engine drive system) shown in FIGS. 2-4 may be substituted for other components requiring heating or cooling. Likewise, additional components may be fluidly connected within the circuits depicted in FIGS. 2-4.

In certain examples, the thermal management systems 40 may operate any of the valves 65, 73, 76, 79, 85, 86, 88, 167, 176, 195 and any other valves based on one or more temperature sensors 50 that sense temperatures in the conduits 61, 75, 94, 161, 175, 191. The temperature sensors 50 may be of a type presently known in the art. In certain examples, the thermal management system 40 may also control the heating or cooling of the circuits 60, 70, 93, 160, 170, 190 via control of valves 65, 73, 76, 79, 85, 86, 88, 167, 176, 195 changing flow rates via the pumps 64, 87, 164, 173, 194, or other methods discussed herein. In one non-limiting example, the temperature sensor 50 senses the temperature of the second heat transfer fluid in the second closed loop circuit 170 and sends corresponding signals to the control system 100. The control system 100 compares the sensed temperature to a predetermined threshold temperature and determines if the valve 176 should be operated to a different position and/or the operation of the pump 173 should be modified to change the flow direction and/or rate of the second heat transfer fluid.

Figure 5:
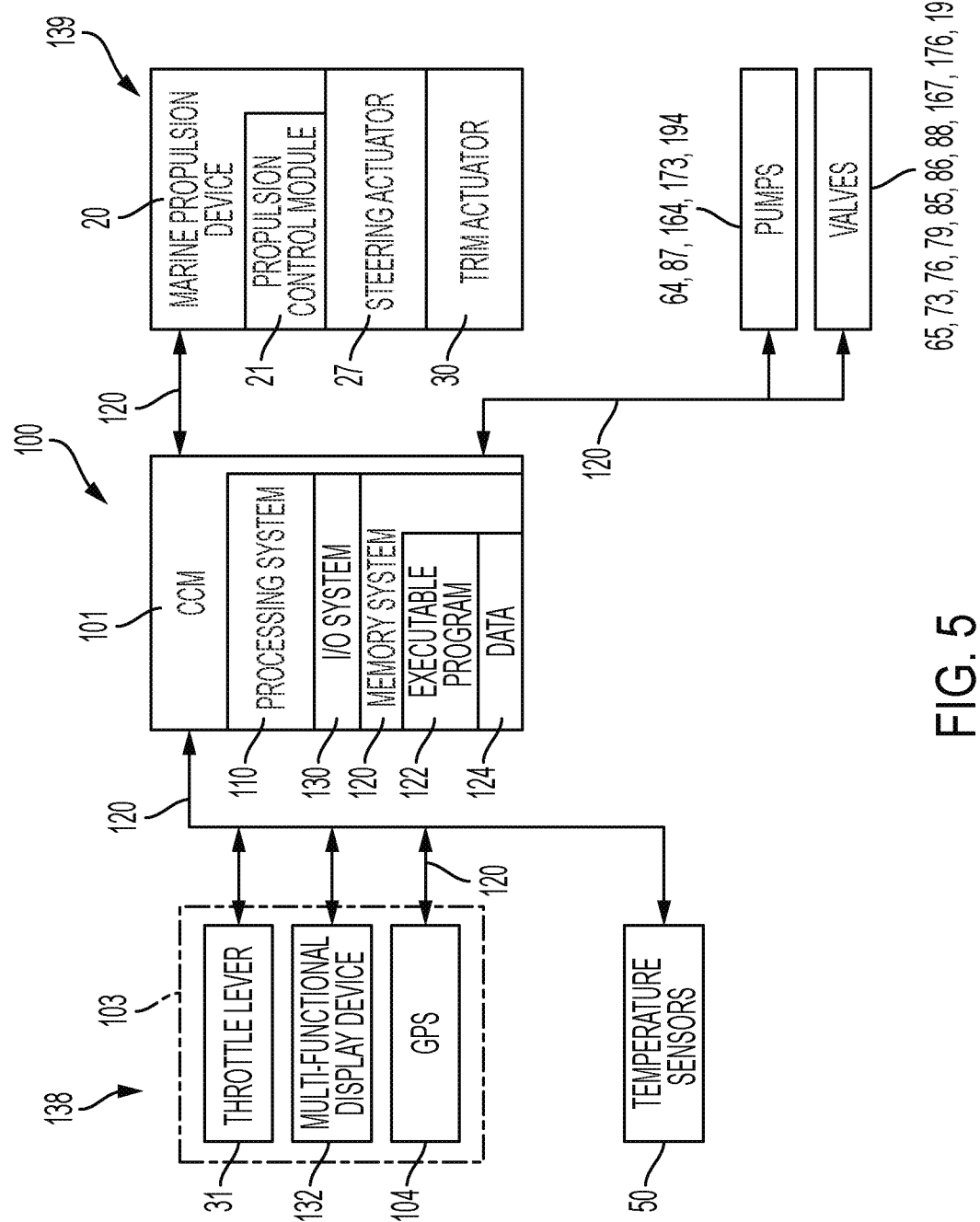
FIG. 5 is a schematic view of an example control system according to the present disclosure.

The systems 40 of the present disclosure include a control system 100, exemplarily depicted in FIG. 5. The control system 100 includes one or more central control modules 101, one or more propulsion control modules 21, the helm controller 103, and/or other controllers of the marine vessel 10. A person of ordinary skill in the art will recognize that these subsystems may also be present within additional central control modules 101 (as applicable) and/or propulsion control modules 21 or other controllers within the marine vessel 10. In the example shown, the central control module 101 includes a processing system 110, which may be implemented as a single microprocessor or other circuitry or be distributed across multiple processing devices or subsystems that cooperate to execute the executable program 122 from a memory system 120 of the central control module 101. Non-limiting examples of the processing system include general purpose central processing units, application specific processors, and logic devices.

Certain aspects of the present disclosure are described or depicted as functional and/or logical block components or processing steps, which may be performed by any number of hardware, software, and/or firmware components configured to perform the specified functions. For example, certain embodiments employ integrated circuit components, such as memory elements, digital signal processing elements, logic elements, look-up tables, or the like, configured to carry out a variety of functions under the control of one or more processors or other control devices. The connections between functional and logical block components are merely exemplary, which may be direct or indirect, and may follow alternate pathways.

The memory system 120 may comprise any storage media readable by the processing system 110 and capable of storing the executable program 122 and/or data 124. The memory system 120 may be implemented as a single storage device or be distributed across multiple storage devices or sub-systems that cooperate to store computer readable instructions, data structures, program modules, or other data. The memory system 120 may include volatile and/or non-volatile systems and may include removable and/or non-removable media implemented in any method or technology for storage of information. The storage media may include non-transitory and/or transitory storage media, including random access memory, read only memory, magnetic discs, optical discs, flash memory, virtual memory, and non-virtual memory, magnetic storage devices, or any other medium which can be used to store information and be accessed by an instruction execution system, for example. An input/output (I/O) system 130 provides communication between the control system 100 and peripheral devices, such as input devices 138 and output devices 139, which are discussed further below. The IO system 130 communicates via wires and/or wirelessly via input devices 138 and/or output devices 139, or with other elements of the control system 100. In practice, the processing system 110 loads and executes an executable program 122 from the memory system 120, accesses data 124 stored within the memory system 120, and directs the thermal management system 40 to operate as described in further detail below.

A person of ordinary skill in the art will recognize that these subsystems within the control system 100 may be implemented in hardware and/or software that carries out a programmed set of instructions. As used herein, the term "central control module" may refer to, be part of, or include an application specific integrated circuit (ASIC); an electronic circuit; a combinational logic circuit; a field programmable gate array (FPGA); a processor (shared, dedicated, or group) that executes code; other suitable components that provide the described functionality; or a combination of some or all of the above, such as in a system-on-chip (SoC). A central control module may include memory (shared, dedicated, or group) that stores code executed by the processing system. The term "code" may include software, firmware, and/or microcode, and may refer to programs, routines, functions, classes, and/or objects. The term "shared" means that some or all code from multiple central control modules may be executed using a single (shared) processor. In addition, some or all code from multiple central control modules may be stored by a single (shared) memory. The term "group" means that some or all code from a single central control module may be executed using a group of processors. In addition, some or all code from a single central control module may be stored using a group of memories. One or more central control module may together constitute a control system 100 and may be located anywhere on the marine vessel 10.

A person of ordinary skill in the art will understand in light of the disclosure that the control system 100 may include a differing set of one or more control modules, or control devices, which may include engine control modules (ECMs) or propulsion control modules 21 for each marine propulsion device 20 (which, when applicable, may be referred to as ECMs even if the marine propulsion device 20 contains an electric motor in addition to or in place of an internal combustion engine), one or more thrust vector control modules (TVMs), one or more helm control modules (HCMs), and/or the like. Likewise, certain aspects of the present disclosure are described or depicted as functional and/or logical block components or processing steps, which may be performed by any number of hardware, software, and/or firmware components configured to perform the specified functions. For example, certain embodiments employ integrated circuit components, such as memory elements, digital signal processing elements, logic elements, look-up tables, or the like, configured to carry out a variety of functions under the control of one or more processors or other control devices.

The control system 100 communicates with each of the one or more components of the marine vessel 10 via a communication link 102, which can be any wired or wireless link. The illustrated communication link 102 connections between functional and logical block components are merely exemplary, which may be direct or indirect, and may follow alternate pathways. The control system 100 is capable of receiving information and/or controlling one or more operational characteristics of the marine vessel 10 and its various sub-systems by sending and receiving control signals via the communication links 102. In one example, the communication link 102 is a controller area network (CAN) bus; however, other types of links could be used. It will be recognized that the extent of connections and the communication links 102 may in fact be one or more shared connections, or links, among some or all of the components in the marine vessel 10. Moreover, the communication link 102 lines are meant only to demonstrate that the various control elements are capable of communicating with one another, and do not represent actual wiring connections between the various elements, nor do they represent the only paths of communication between the elements. Additionally, the marine vessel 10 may incorporate various types of communication devices and systems, and thus the illustrated communication links 102 may in fact represent various different types of wireless and/or wired data communication systems.

As will be discussed further below, the control system 100 communicates with input devices 138 from various components such as sensors incorporated into the throttle lever 31 and/or a steering device. The control system 100 also communicates with other input devices 299, such as the multi-functional display device 132, the GPS 104, and the temperature sensors 50.

The control system 100 also communicates with output devices 139 such as propulsion control modules 21 of the marine propulsion devices 20, the steering actuators 27 (and steering angle sensors associated therewith), and the trim actuators 30 (and trim angle sensors associated therewith), as well as any of the pumps (e.g., pumps 64, 87, 164, 173, 194) and valves (e.g., valves 65, 73, 76, 79, 85, 86, 88, 167, 176, 195) described herein. It will be recognized that the arrows shown are merely exemplary and that communication may flow in multiple directions. For example, the multi-functional display device 132 may serve as both the input device 138 for the operator to provide commands and the output device 139 to display information transmitted from the central control module 101.

FIGS. 6-10 depict various example methods for heating the potable water in the water heater 80 on the marine vessel 10 of the present disclosure. The methods are described as a series of logic steps, the effects of which were already discussed above with respect to FIGS. 1-5. Note that while the methods described below make reference to one or more example thermal management systems 40 depicted in FIGS. 1-5, it should be understood that one or more steps from any of methods may be incorporated into any other method. Furthermore, the present disclosure contemplates that any combination of individual or multiple steps from any of the methods described herein below may be applicable and/or utilized by any example thermal management systems 40 of the present disclosure and the present disclosure is not limited to the specific combination of steps set forth below in each other example methods.

Figure 6:
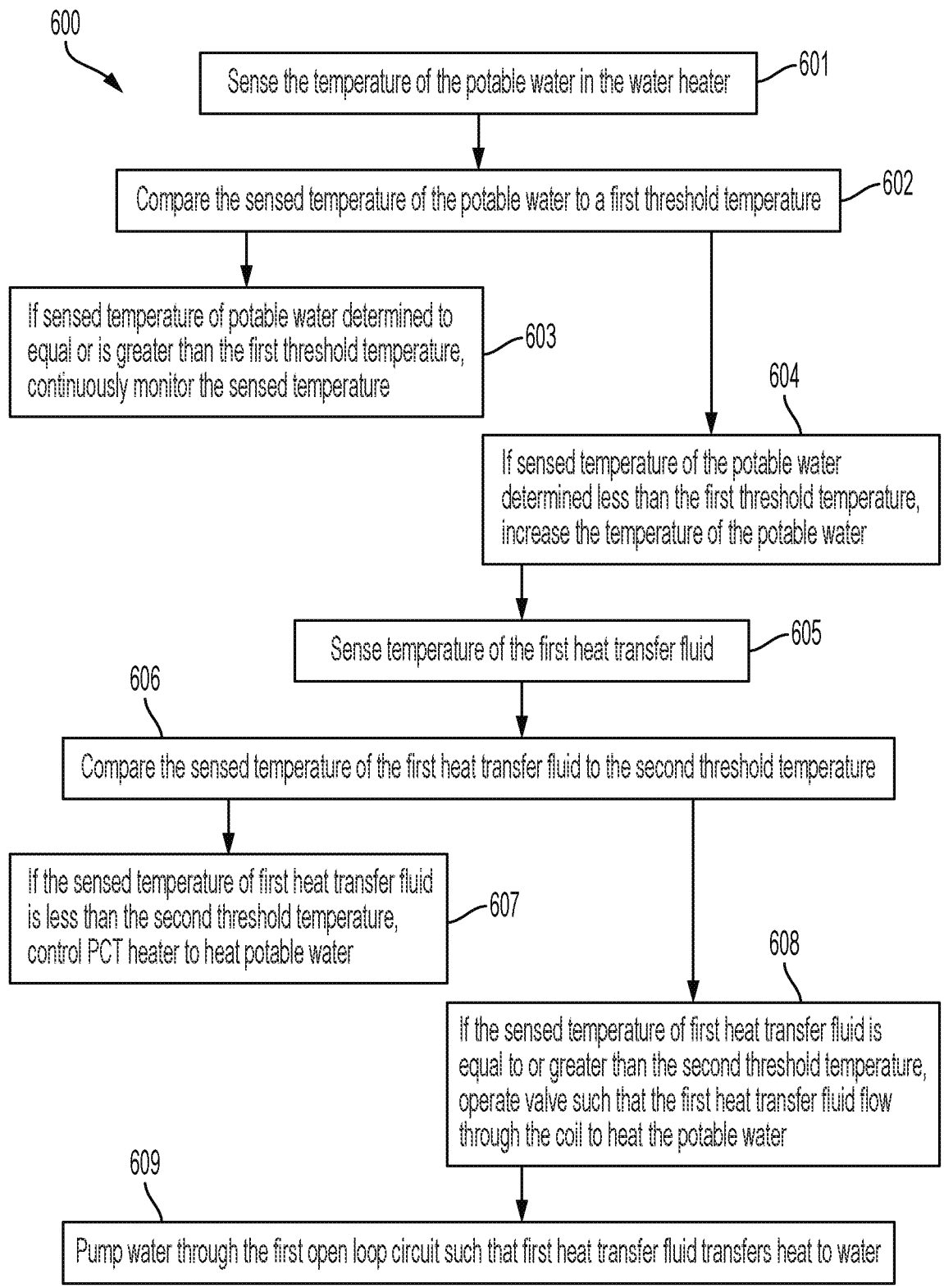
FIGS. 6-10 are flow charts depicting example methods for operating thermal management systems of the present disclosure.

FIG. 6 depicts an example of a method 600 for heating the potable water in the water heater 80 on the marine vessel 10 according to the present disclosure, which references to elements shown in FIG. 2. The method 600 begins at step 601 with a first temperature sensor 50 (FIG. 5) sensing the temperature of the potable water in the water heater 80. The control system 100 receives signals from the temperature sensor 50 corresponding to the sensed temperature of the potable water in the water heater 80. The control system 100 compares, at step 602, the sensed temperature of the potable water to a first threshold temperature (e.g., the first threshold temperature is based on an algorithm, acceptable temperature range, temperature value in a look-up table). For example, the first threshold temperature is a minimum temperature necessary such that the potable water dispensing from the water heater 80 is at a desired temperature (e.g., 40 degrees Celsius).

If the control system 100 determines, at step 603, that the sensed temperature of the potable water is equal to or greater than the first threshold temperature, the control system 100 does not send any immediate action control signals to other components of the system 40 and the control system 100 continuously monitors the sensed temperature of the potable water. However, if the control system 100 determines, at step 604 that the sensed temperature of the potable water is less than the first threshold temperature, the control system 100 is configured to facilitate control of other components in the system 40 to thereby increase the temperature of the potable water in the water heater 80. At step 605, a second temperature sensor 50 senses the temperature of the first heat transfer fluid in the first closed loop circuit 70. The control system 100 compares, at step 606, the sensed temperature of the first heat transfer fluid to a second threshold temperature (e.g., the second threshold temperature is between 45-50 degrees Celsius, greater than 45 degrees Celsius, or greater than 50 degrees Celsius at the condenser outlet before expansion valve 73). Note that in certain examples the second threshold temperature is based on an algorithm, acceptable temperature range, temperature value in a look-up table. In one non-limiting example, the second threshold temperature is a minimum temperature of the first fluid transfer fluid that can be utilized to increase the temperature of the potable water in the water heater 80 (e.g., the second threshold temperature is greater than the first threshold temperature, the second threshold temperature necessary to avoid improper operation of the refrigeration components). Note that the first heat transfer fluid exiting the compressor 71 is superheated (e.g., 50-70 degrees Celsius), and thus the present inventors recognized that the heated first heat transfer fluid can be used to heat the potable water instead of immediately transferring the heat to the water in the first open loop circuit 60 via the condenser 74. As such, the potable water in the water heater 80 acts as a heat sink and captures this heat for a usable purpose.

At step 607, if the sensed temperature for the first heat transfer fluid is less than the second threshold temperature, the control system 100 determines that there is insufficient heat in the first heat transfer fluid to increase the temperature of the potable water in the water heater 80. Note that the situation of the temperature of the first heat transfer fluid being below the second threshold temperature may occur when the HVAC system 41, 42 is not operating to cool air in a compartment of the marine vessel 10 and therefore the first heat transfer fluid is not absorbing heat from the air in the compartment. As such, the control system 100 sends control signals to the positive temperature coefficient (PTC) heater 89 to generate heat that thereby heats the potable water in the water heater 80. The PTC heater 89 uses electrical energy from the power source 90 to heat the potable water, and the control system 100 continues to control the PTC heater 89 until the sensed temperature of the potable water increases to or above the first threshold temperature.

However, at step 608, if the sensed temperature of the first heat transfer fluid is equal to or greater than the second threshold temperature, the control system 100 determines that there is sufficient heat in the first heat transfer fluid to increase the temperature of the potable water in the water heater 80. Note that the temperature of the first heat transfer fluid being at or above the second threshold temperature may occur when the HVAC system 41, 42 is operating to cool air in a compartment of the marine vessel 10. In these instances, the first heat transfer fluid is absorbing heat from the air in the compartment via a refrigeration component (e.g., evaporator 72). As such, the control system 100 sends control signals to the valve 76 to operate to the second position such that the first heat transfer fluid flows through the coil 77. Heat is then transferred from the first heat transfer fluid to the potable water via the coil.

Note that the first heat transfer fluid passing through the coil 77 may be further cooled by the water in the first open loop circuit 60. As such, the method 600 may optionally, at step 609, include the steps of the control system 100 operating the pump 64 to pump water through the first open loop circuit 60 and another refrigeration component (e.g., condenser 74). The first heat transfer fluid also passes through the condenser 74 and thus heat is transferred from the first heat transfer fluid to the water. The heated water is then returned to the body of water 3. The control system 100 is also configured to not operate the pump 64 in the event that the sensed temperature of the first heat transfer fluid at a position upstream of the condenser 74 and downstream from the coil 77 (as sensed by another temperature sensor 50) is below a third threshold temperature (e.g., the third threshold temperature is 5-10 degrees Celsius greater than the temperature of the body of water in which the marine vessel 10 is located). In these instances, no heat is transferred from the first heat transfer fluid to the water. This control sequence advantageously prevents the first heat transfer fluid from being supercooled and damaging refrigeration components coupled to the first closed loop circuit 70. Furthermore, this control sequence may also advantageously reduce the energy consumption from the pump 64 as part of the condensation heat transfer that is taken care of in the coil 77 by rejecting heat to the potable water in reservoir 81.

Figure 7:
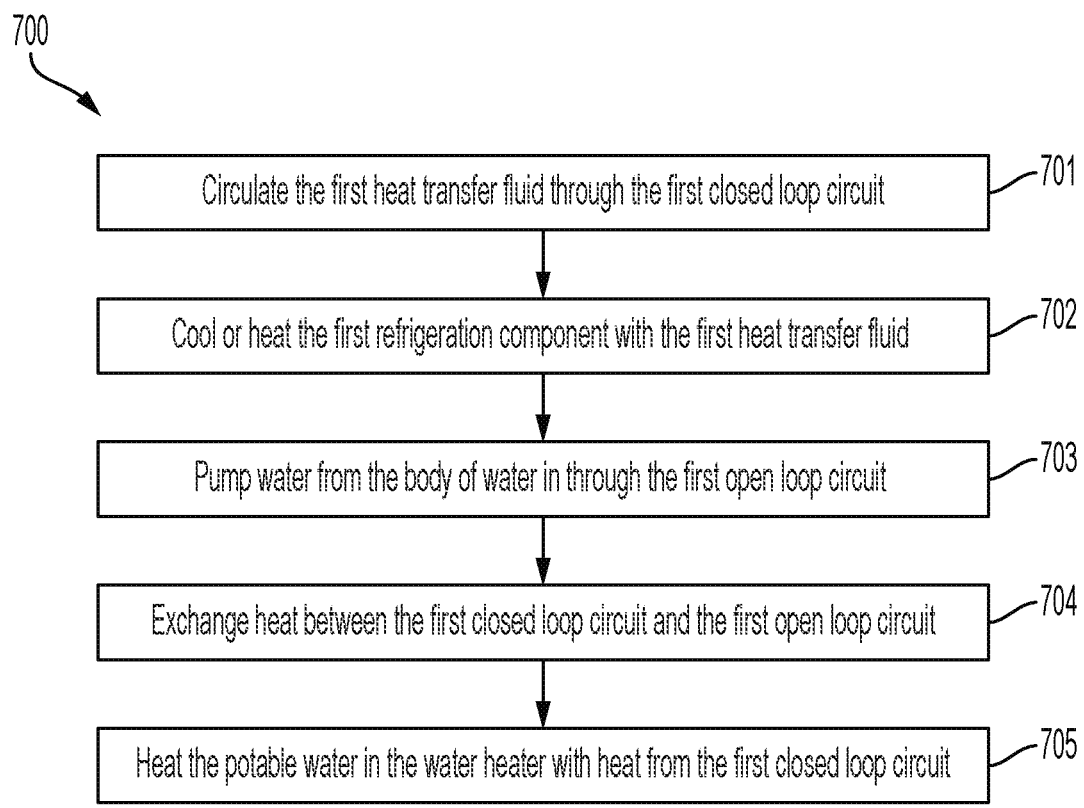

FIG. 7 depicts another example method 700 according to the present disclosure. The method 700 for heating the potable water in the water heater 80 with the thermal management system 40 includes circulating the first heat transfer fluid through the first closed loop circuit 70, at step 701. At step 702, the first refrigeration component (e.g., evaporator 72) is cooled or heated with the first heat transfer fluid such that the refrigeration component cools or heats air in the compartment of the marine vessel 10. The pump 64, pumps the water from a body of water in which the marine vessel is operating (at step 703) through the first open loop circuit 60 and back to the body of water. At step 704, heat is exchanged between the first closed loop circuit 70 and the first open loop circuit 60. As such, at step 705, the water heater 80 receives heat from the first closed loop circuit 70 to heat the potable water in the water heater 80.

In certain examples, the method 700 includes the step of operating the valve 76 to selectively exchange heat between the first heat transfer fluid and the potable water in the water heater 80 via the coil 77 or route the heat transfer fluid to bypass the water heater 80 and/or the coil 77.

Figure 8:
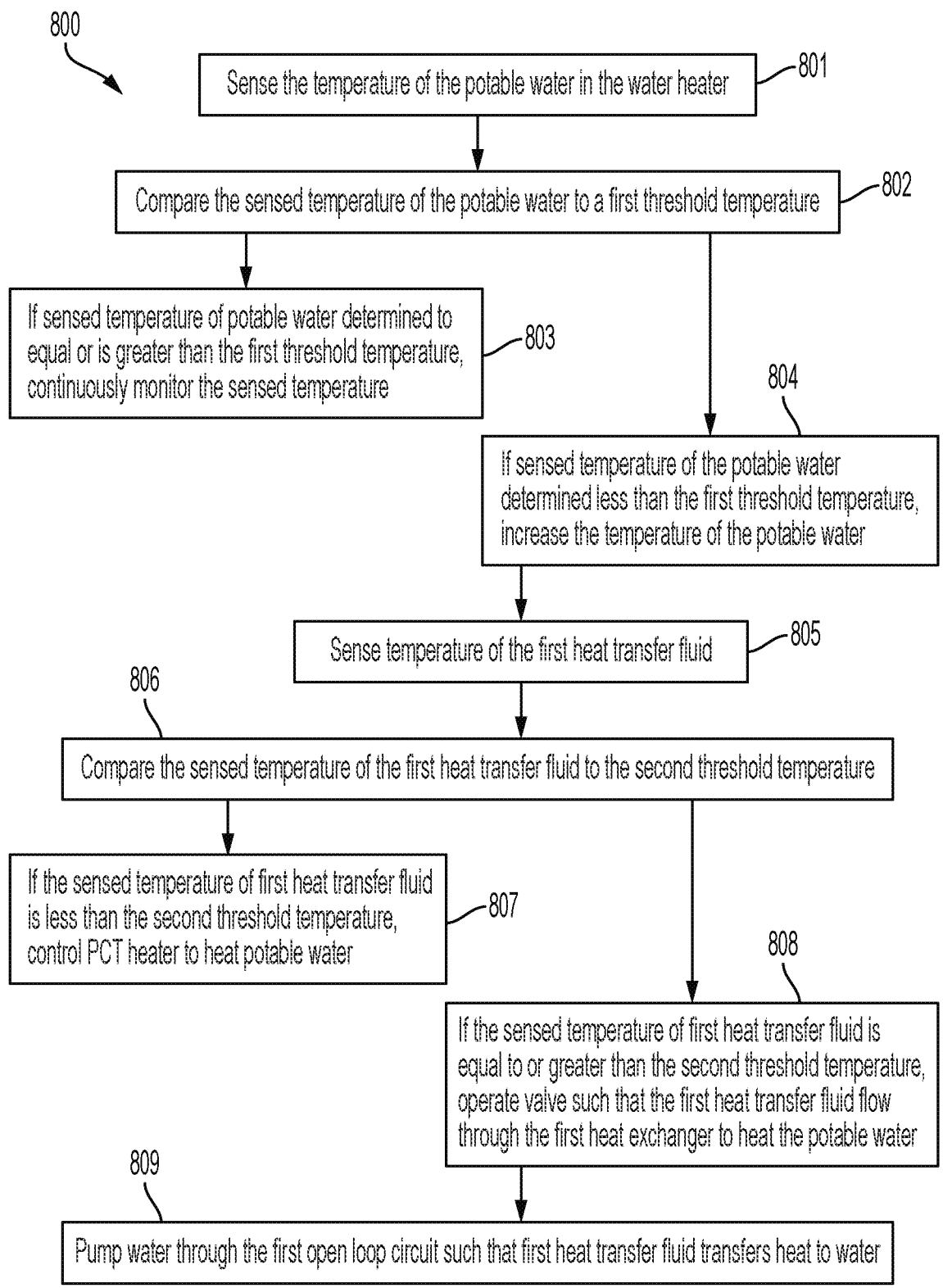

FIG. 8 depicts another example method 800 according to the present disclosure, with reference to FIG. 3. In this example, the method begins at step 801 with the first temperature sensor 50 (FIG. 5) sensing the temperature of the potable water in the water heater 80. The control system 100 receives signals from the temperature sensor 50 corresponding to the sensed temperature of the potable water in the water heater 80. The control system 100 compares, at step 802, the sensed temperature of the potable water to the first threshold temperature.

If the control system 100 determines, at step 803, that the sensed temperature is equal to or greater than the first threshold temperature, the control system 100 does not send any immediate action control signals and the control system 100 continuously monitors the sensed temperature of the potable water. However, if the control system 100 determines, at step 804 that the sensed temperature of the potable water is below the first threshold temperature, the control system 100 is configured to facilitate control of other components in the system 40 to thereby increase the temperature of the potable water in the water heater 80.

At step 805, the second temperature sensor 50 senses the temperature of the first heat transfer fluid in the first closed loop circuit 70. The first closed loop circuit 70 extends through the first heat exchanger 78, and the potable water circuit 93 also extends through the first heat exchanger 78. The control system 100 compares, at step 806, the sensed temperature of the first heat transfer fluid to the second threshold temperature. At step 807, if the sensed temperature of the first heat transfer fluid is less than the second threshold temperature, the control system 100 determines that there is insufficient heat in the first heat transfer fluid to increase the temperature of the potable water in the water heater 80. As such, the control system 100 sends control signals to the PTC heater 89 to generate heat that thereby heats the potable water in the water heater 80.

However, at step 808, if the sensed temperature of the first heat transfer fluid is equal to or greater than the second threshold temperature, the control system 100 determines that there is sufficient heat in the first heat transfer fluid to increase the temperature of the potable water in the water heater 80. As such, the control system 100 sends control signals to the valve 86 to a position in which the potable water flows through the potable water circuit 93 and the first heat exchanger 78. Heat is then transferred from the first heat transfer fluid to the potable water via the first heat exchanger 78.

Note that the first heat transfer fluid passing through the first heat exchanger 78 may be further cooled by the water in the first open loop circuit 60. As such, the method 800 may optionally, at step 809, include the steps of the control system 100 operating the pump 64 to pump water through the first open loop circuit 60 and another refrigeration component (e.g., condenser 74). The first heat transfer fluid also passes through the condenser 74 and thus heat is transferred from the first heat transfer fluid to the water. The heated water is then returned to the body of water 3. The control system is also configured to not operate the pump 64 in the event that the sensed temperature of the first heat transfer fluid (from another temperature sensor 50) upstream of the condenser 74 and downstream from the first heat exchanger 78 is below he third threshold temperature. In these instances, no heat is transferred from the first heat transfer fluid to the water. This control sequence advantageously prevents the first heat transfer fluid from being supercool.

In certain examples, the method 800 includes the step of operating the valve 86 to selectively route the potable water along a first water path 95 to the first heat exchanger 78 or a second water path 96 such the potable water flows directly from the storage tank 82 to the reservoir 81 of the water heater 80.

Figure 9:
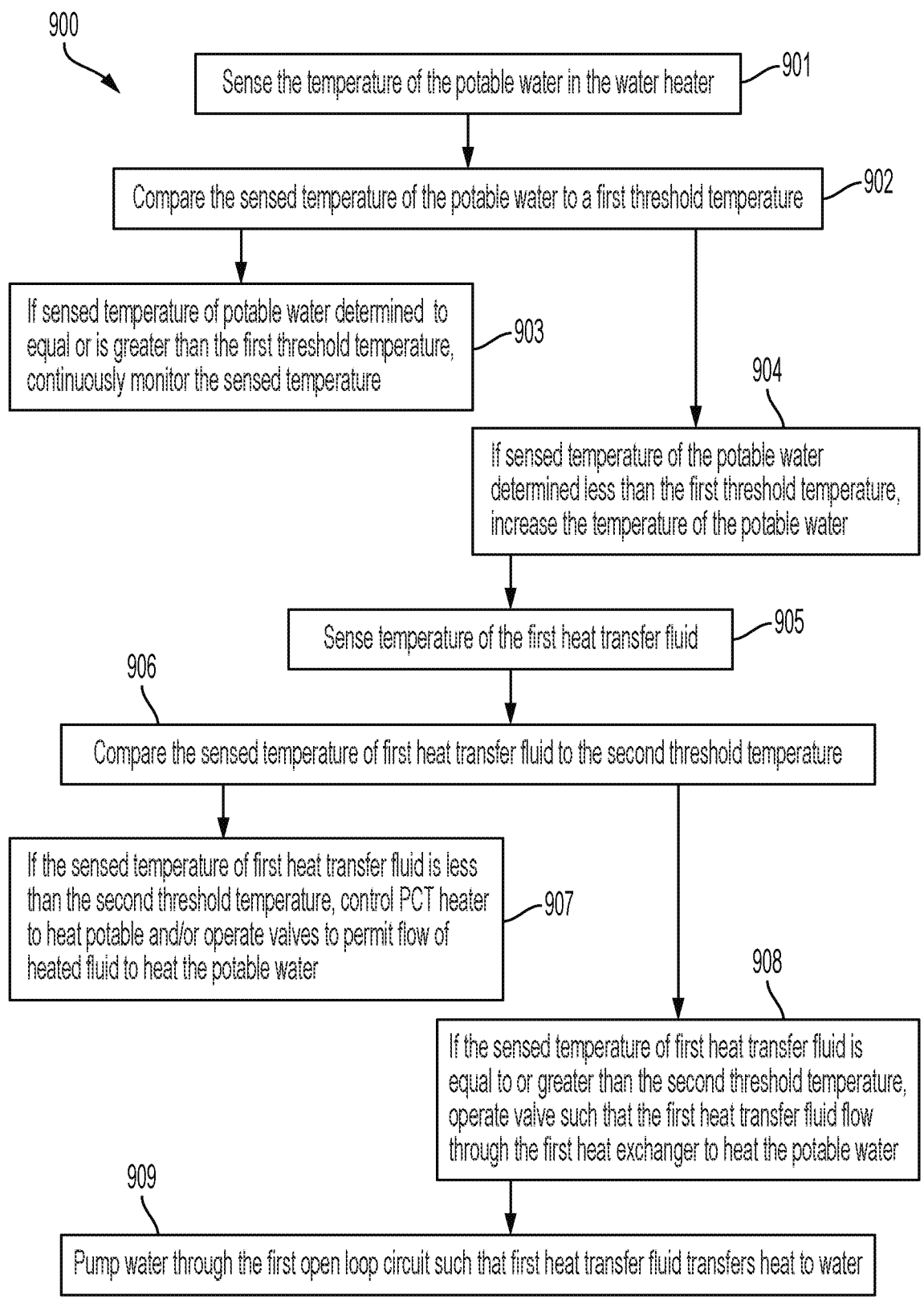

FIG. 9 depicts another example method 900 according to the present disclosure, with reference to Fig. The method 900 may combine one or more steps of other methods of the present disclosure that are associated with the first heat exchanger 78 and the coil 77. The method 900 begins at step 901 with the first temperature sensor 50 (FIG. 5) sensing the temperature of the potable water in the water heater 80. The control system 100 receives signals from the temperature sensor 50 corresponding to the sensed temperature of the potable water in the water heater 80. The control system 100 compares, at step 902, the sensed temperature of the potable water to the first threshold temperature. If the control system 100 determines, at step 903, that the sensed temperature is equal to or greater than the first threshold temperature, the control system 100 does not send any immediate action control signals and the control system 100 continuously monitors the sensed temperature of the potable water.

However, if the control system 100 determines, at step 904, that the sensed temperature of the potable water is less than the first threshold temperature, the control system 100 is configured to facilitate control of other components in the system 40 to thereby increase the temperature of the potable water in the water heater 80.

At step 905, the second temperature sensor 50 senses the temperature of the first heat transfer fluid in the first closed loop circuit 70. The first closed loop circuit 70 extends through the first heat exchanger 78 and/or the coil 77, and the potable water circuit 93 also extends through the first heat exchanger 78. The control system 100 compares, at step 906, the sensed temperature of the first heat transfer fluid to the second threshold temperature. At step 907, if the sensed temperature of the first heat transfer fluid is less than the second threshold temperature, the control system 100 determines that there is insufficient heat in the first heat transfer fluid to increase the temperature of the potable water in the water heater 80. As such, the control system 100 sends control signals to the PTC heater 89 to generate heat that thereby heats the potable water in the water heater 80. Additionally or optionally, the control system 100 sends control signals to operate the valve 176 such that the second heat transfer fluid of the second closed loop circuit 170 flows through the coil 177. The second heat transfer fluid heats the potable water via the coil 77. Additionally or optionally, the control system 100 sends control signals to operate the valve 195 such that the heated water in the third open loop circuit 190 flows through the coil 198. The heated water heats the potable water via the coil 198. The present inventors recognized that allowing the control system 100 to control one or multiple circuits can help maintain the first threshold temperature of the potable water, reduce heat waste that may otherwise be disposed of to the body of water 3, and/or increase electrical power efficiency of the marine vessel 10 (e.g., using heat from one or more circuits reduces the amount of electrical power from the marine vessel 10 needed to heat the potable water).

However, at step 908, if the sensed temperature of the first heat transfer fluid is equal to or greater than the second threshold temperature, the control system 100 determines that there is sufficient heat in the first heat transfer fluid to increase the temperature of the potable water in the water heater 80. As such, the control system 100 sends control signals to the valve 86 to a position in which the potable water flows through the potable water circuit 93 and the first heat exchanger 78. The control system 100 also sends control signals to operate the valve 79 to position in which the first heat transfer fluid to the first heat exchanger 78 and/or the coil 77. Heat is then transferred from the first heat transfer fluid to the potable water via the first heat exchanger 78 and/or the coil 77. In certain examples, the control system 100 also sends control signals to operate the valves 176, 195 such that the heated water in the second closed loop circuit 170 or the third open loop circuit 190 flows through coils 177, 198, respectively, to heat the potable water. The present inventors recognized that utilizing multiple circuits to heat the potable water can quickly heat the potable water and/or increase electrical power efficiency of the marine vessel 10 (e.g., using heat from one or more circuits reduces the amount of electrical power from the marine vessel 10 needed to heat the potable water).

Figure 10:
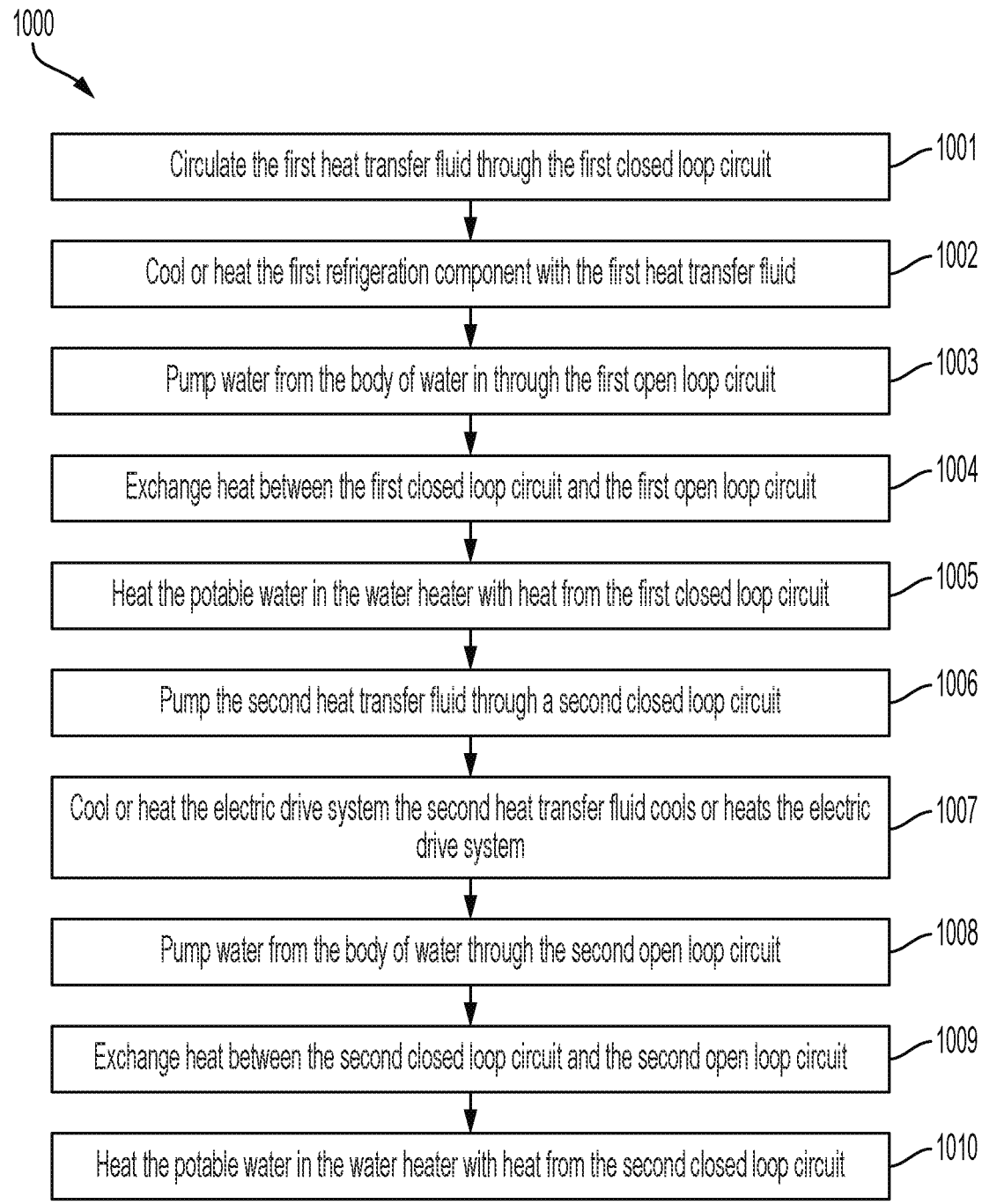

FIG. 10 depicts another example method 1000 according to the present disclosure. The method 1000 is for heating the potable water in the water heater 80 with the thermal management system 40 includes circulating the first heat transfer fluid through the first closed loop circuit 70, at step 1001.

At step 1002, the first refrigeration component (e.g., evaporator 72) is cooled or heated with the first heat transfer fluid such that the refrigeration component cools or heats air in the compartment of the marine vessel 10. The pump 64, pumps the water from a body of water in which the marine vessel is operating (at step 1003) through the first open loop circuit 60 and back to the body of water. At step 1004, heat is exchanged between the first closed loop circuit 70 and the first open loop circuit 60. As such, at step 1005, the water heater 80 receives heat from the first closed loop circuit 70 to heat the potable water in the water heater 80. At step 1006, the pump 173 pumps the second heat transfer fluid through a second closed loop circuit 160 and at step 1007 the second heat transfer fluid cools or heats the electric motor system 180.

The pump 164 pumps, at step 1008 water from the body of water through the second open loop circuit 160 and back to the body of water 3. At step 1009 heat exchanges between the second closed loop circuit 170 and the second open loop circuit 160. At step 1010 the water heater 80 receives heat from the second closed loop circuit 170 to heat the potable water in the water heater 80.

Additionally or optionally, the method 1000 sending control signals to operate the valve 195 such that the heated water in the third open loop circuit 190 flows through coils 198, respectively, to heat the potable water. The water is the third loop circuit 190 is heated by the drive system 197 as noted above.

It should be recognized that other methods are also contemplated by the present disclosure, and that these methods may be used for thermally managing components other than those expressly discussed and shown.

It should be further recognized that while the present disclosure generally provided examples of thermal management systems 40 used in conjunction with marine vessels, other uses and context are also contemplated, including recreational vehicles (RVs) and other vehicles having components requiring cooling and/or heating. The present inventors have recognized unmet needs for thermally managing various refrigeration devices and systems such as evaporators and water heaters. In certain examples, any heat loads that consume power for cooling or heating result in inefficiency and, particularly for vehicles that also use electric power for propulsion, reduced operating range. Therefore, to extend the operating range of these vehicles, it is important to improve efficiency of heat transfer and reuse heat where possible. Refrigeration systems that can operate in heat pump mode are commonly employed to provide cooling and heating. In certain examples, one or more of the circuits 60, 70, 93, 160, 170, 190 of the system 40 could be operated in a heat pump mode such that heat is provided to one or more components or spaces of the marine vessel 10. Refrigeration systems are often required to provide battery cooling. The present inventors have recognized that the heating and cooling needs of power systems (e.g., batteries), propulsion devices, and house loads (e.g., HVAC) can be combined together for a more efficient thermal management system for vehicles.

In certain independent examples, a thermal management system for a marine vessel includes a closed loop circuit in which heat transfer fluid circulates, a first refrigeration component cooled or heated by the heat transfer fluid and configured to cool or heat air within a compartment on the marine vessel, and an open loop circuit. A pump is configured to pump water from a body of water in which the marine vessel is operating, through the open loop circuit, and back to the body of water. A second refrigeration component is configured to exchange heat between the closed loop circuit and the open loop circuit, and a water heater is configured to receive heat from the closed loop circuit to thereby heat potable water in the water heater.

Optionally, a first valve is for selecting whether heat is exchanged between the heat transfer fluid and the potable water in the water heater or the heat transfer fluid bypasses the water heater. Optionally, a heat exchanger is configured to exchange heat between the heat transfer fluid and the potable water. Optionally, a second valve is for selecting whether the potable water flows via a first water path to the heat exchanger or a second water path such the potable water flows directly from a storage tank to a reservoir of the water heater. Optionally, a water pump conveys the potable water from the potable water storage tank to the water heater. Optionally, the closed loop circuit is a first closed loop circuit, the pump is a first pump, the heat transfer fluid is a first heat transfer fluid, and the open loop circuit is a first open loop circuit. The system also includes a second closed loop circuit, a second pump that pumps a second heat transfer fluid through the second closed loop circuit; an electric motor system cooled or heated by the second heat transfer fluid, a second open loop circuit, a third pump configured to pump water from the body of water, through the second open loop circuit, and back to the body of water, and a third refrigeration component configured to exchange heat between the second closed loop circuit and the second open loop circuit. The second closed loop circuit heats the potable water in the water heater, and the water heater is configured to receive heat from the second closed loop circuit to thereby heat the potable water. Optionally, a third valve is for selecting whether heat is exchanged between the second heat transfer fluid and the potable water in the water heater or the second heat transfer fluid bypasses the water heater. Optionally, the system includes a third open loop circuit, a fourth pump configured to pump water from the body of water, through the third open loop circuit, and back to the body of water, and a drive system configured to exchange heat with the water passing through the third open loop circuit. The water heater is configured to receive heat from the third open loop circuit to thereby heat the potable water. Optionally, the closed loop circuit is a first closed loop circuit, the pump is a first pump, the heat transfer fluid is a first heat transfer fluid, and the open loop circuit is a first open loop circuit, and system also includes a third open loop circuit, a fourth pump configured to pump water from the body of water, through the third open loop circuit, and back to the body of water, and a drive system configured to exchange heat with the water passing through the third open loop circuit. The water heater is configured to receive heat from the third open loop circuit to thereby heat the potable water. Optionally, a fourth valve for selecting whether heat is exchanged between the water in the third open loop circuit and the potable water in the water heater or the water in the third open loop circuit bypasses the water heater.

In certain independent examples, a method of heating potable water in a water heater on a marine vessel includes circulating a heat transfer fluid through a closed loop circuit, cooling or heating a refrigeration component with the heat transfer fluid such that the refrigeration component cools or heats air in a compartment of the marine vessel, pumping water from a body of water in which the marine vessel is operating through an open loop circuit and back to the body of water, exchanging heat between the closed loop circuit and the open loop circuit, and receiving heat into the water heater from the closed loop circuit to heat the potable water in the water heater.

Optionally, the method includes operating a first valve to selectively exchange heat between the heat transfer fluid and the potable water in the water heater or route the heat transfer fluid to bypass the water heater. Optionally, the method includes exchanging heat, with a heat exchanger, between the heat transfer fluid and the potable water. Optionally, the method includes operating a second valve to selectively route the potable water along a first water path to the heat exchanger or a second water path such the potable water flows directly from a potable water storage tank to a reservoir of the water heater. Optionally, the method includes pumping the potable water from the potable water storage tank to the water heater. Optionally, the closed loop circuit is a first closed loop circuit, the heat transfer fluid is a first heat transfer fluid, the open loop circuit is a first open loop circuit, and the method also includes pumping a second heat transfer fluid through a second closed loop circuit, cooling or heating an electric motor system with the second heat transfer fluid, pumping water from the body of water through a second open loop circuit and back to the body of water, exchanging heat between the second closed loop circuit and the second open loop circuit, and receiving heat into the water heater from the second closed loop circuit to heat the potable water in the water heater. Optionally, the method includes operating a third valve to selectively exchange heat between the second heat transfer fluid and the potable water in the water heater or route the second heat transfer fluid to bypass the water heater. Optionally, the method includes pumping water from the body of water through a third open loop circuit and back to the body of water, cooling or heating a drive system with the water in the third open loop circuit, and receiving heat into the water heater from the third open loop circuit to heat the potable water in the water heater. Optionally, the method includes operating a fourth valve to selectively exchange heat between the water in the third open loop circuit and the potable water in the water heater or route the water in the third open loop circuit to bypass the water heater.

Citations to a number of references are made herein. The cited references are incorporated by reference herein in their entireties. In the event that there is an inconsistency between a definition of a term in the specification as compared to a definition of the term in a cited reference, the term should be interpreted based on the definition in the specification.

In the present description, certain terms have been used for brevity, clarity, and understanding. No unnecessary limitations are to be inferred therefrom beyond the requirement of the prior art because such terms are used for descriptive purposes and are intended to be broadly construed. The different apparatuses, systems, and method steps described herein may be used alone or in combination with other apparatuses, systems, and methods. It is to be expected that various equivalents, alternatives and modifications are possible within the scope of the appended claims.

The functional block diagrams, operational sequences, and flow diagrams provided in the Figures are representative of exemplary architectures, environments, and methodologies for performing novel aspects of the disclosure. While, for purposes of simplicity of explanation, the methodologies included herein may be in the form of a functional diagram, operational sequence, or flow diagram, and may be described as a series of acts, it is to be understood and appreciated that the methodologies are not limited by the order of acts, as some acts may, in accordance therewith, occur in a different order and/or concurrently with other acts from that shown and described herein. For example, those skilled in the art will understand and appreciate that a methodology can alternatively be represented as a series of interrelated states or events, such as in a state diagram. Moreover, not all acts illustrated in a methodology may be required for a novel implementation.

This written description uses examples to disclose the invention, including the best mode, and also to enable any person skilled in the art to make and use the invention. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. A thermal management system for a marine vessel, the thermal management system comprising:
   a closed loop circuit in which heat transfer fluid circulates;
   a first refrigeration component cooled or heated by the heat transfer fluid and configured to cool or heat air within a compartment on the marine vessel;
   an open loop circuit;
   a pump configured to pump water from a body of water in which the marine vessel is operating, through the open loop circuit, and back to the body of water;

a second refrigeration component configured to exchange heat between the closed loop circuit and the open loop circuit; and a water heater configured to receive heat from the closed loop circuit to thereby heat potable water in the water heater.

2. The thermal management system according to claim 1, further comprising a first valve for selecting whether heat is exchanged between the heat transfer fluid and the potable water in the water heater or the heat transfer fluid bypasses the water heater.

3. The thermal management system according to claim 1, further comprising a heat exchanger configured to exchange heat between the heat transfer fluid and the potable water.

4. The thermal management system according to claim 3, further comprising a second valve for selecting whether the potable water flows via:
- a first water path to the heat exchanger; or
- a second water path such that the potable water flows directly from a storage tank to a reservoir of the water heater.

5. The thermal management system according to claim 4, wherein a water pump conveys the potable water from the storage tank to the water heater.

6. The thermal management system according to claim 1, wherein the closed loop circuit is a first closed loop circuit, the pump is a first pump, the heat transfer fluid is a first heat transfer fluid, and the open loop circuit is a first open loop circuit, and further comprising:
- a second closed loop circuit;
- a second pump that pumps a second heat transfer fluid through the second closed loop circuit;
- an electric motor system cooled or heated by the second heat transfer fluid;
- a second open loop circuit;
- a third pump configured to pump water from the body of water, through the second open loop circuit, and back to the body of water; and
- a third refrigeration component configured to exchange heat between the second closed loop circuit and the second open loop circuit;
- wherein heat from the second closed loop circuit heats the potable water in the water heater; and
- wherein the water heater is configured to receive heat from the second closed loop circuit to thereby heat the potable water.

7. The thermal management system according to claim 6, further comprising a third valve for selecting whether heat is exchanged between the second heat transfer fluid and the potable water in the water heater or the second heat transfer fluid bypasses the water heater.

8. The thermal management system according to claim 6, further comprising:
- a third open loop circuit;
- a fourth pump configured to pump water from the body of water, through the third open loop circuit, and back to the body of water; and
- a drive system configured to exchange heat with the water passing through the third open loop circuit; and
- wherein the water heater is configured to receive heat from the third open loop circuit to thereby heat the potable water.

9. The thermal management system according to claim 1, wherein the closed loop circuit is a first closed loop circuit, the pump is a first pump, the heat transfer fluid is a first heat transfer fluid, and the open loop circuit is a first open loop circuit, and further comprising:
- a third open loop circuit;
- a fourth pump configured to pump water from the body of water, through the third open loop circuit, and back to the body of water;
- a drive system configured to exchange heat with the water passing through the third open loop circuit; and
- wherein the water heater is configured to receive heat from the third open loop circuit to thereby heat the potable water.

10. The thermal management system according to claim 9, further comprising a fourth valve for selecting whether heat is exchanged between the water in the third open loop circuit and the potable water in the water heater or the water in the third open loop circuit bypasses the water heater.

11. A method of heating potable water in a water heater on a marine vessel, the method comprising:
- circulating a heat transfer fluid through a closed loop circuit;
- cooling or heating a refrigeration component with the heat transfer fluid such that the refrigeration component cools or heats air in a compartment of the marine vessel;
- pumping water from a body of water in which the marine vessel is operating through an open loop circuit and back to the body of water;
- exchanging heat between the closed loop circuit and the open loop circuit; and
- receiving heat into the water heater from the closed loop circuit to heat the potable water in the water heater.

12. The method according to claim 11, further comprising operating a first valve to selectively exchange heat between the heat transfer fluid and the potable water in the water heater or route the heat transfer fluid to bypass the water heater.

13. The method according to claim 11, further comprising exchanging heat, with a heat exchanger, between the heat transfer fluid and the potable water.

14. The method according to claim 13, further comprising operating a second valve to selectively route the potable water along a first water path to the heat exchanger or a second water path such that the potable water flows directly from a potable water storage tank to a reservoir of the water heater.

15. The method according to claim 14, further comprising pumping the potable water from the potable water storage tank to the water heater.

16. The method according to claim 11, wherein the closed loop circuit is a first closed loop circuit, the heat transfer fluid is a first heat transfer fluid, the open loop circuit is a first open loop circuit, and further comprising:
- pumping a second heat transfer fluid through a second closed loop circuit;
- cooling or heating an electric motor system with the second heat transfer fluid;
- pumping water from the body of water through a second open loop circuit and back to the body of water;
- exchanging heat between the second closed loop circuit and the second open loop circuit; and
- receiving heat into the water heater from the second closed loop circuit to heat the potable water in the water heater.

17. The method according to claim 16, further comprising operating a third valve to selectively exchange heat between the second heat transfer fluid and the potable water in the water heater or route the second heat transfer fluid to bypass the water heater.

18. The method according to claim 16, further comprising:
  pumping water from the body of water through a third open loop circuit and back to the body of water;
  cooling or heating a drive system with the water in the third open loop circuit; and
  receiving heat into the water heater from the third open loop circuit to heat the potable water in the water heater.

19. The method according to claim 18, further comprising operating a fourth valve to selectively exchange heat between the water in the third open loop circuit and the potable water in the water heater or route the water in the third open loop circuit to bypass the water heater.

20. The method according to claim 11, further comprising:
  pumping water from the body of water through a third open loop circuit and back to the body of water;
  cooling or heating a drive system with the water in the third open loop circuit; and
  receiving heat into the water heater from the third open loop circuit to heat the potable water in the water heater.

\* \* \* \* \*